(12) United States Patent
Wu et al.

(10) Patent No.: US 8,290,269 B2
(45) Date of Patent: Oct. 16, 2012

(54) IMAGE DOCUMENT PROCESSING DEVICE, IMAGE DOCUMENT PROCESSING METHOD, PROGRAM, AND STORAGE MEDIUM

(75) Inventors: Bo Wu, Shanghai (CN); Jianjun Dou, Shanghai (CN); Ning Le, Shanghai (CN); Yadong Wu, Shanghai (CN); Jing Jia, Shanghai (CN)

(73) Assignee: Sharp Kabushiki Kaisha, Osaka (JP)

( * ) Notice: Subject to any disclaimer, the term of this patent is extended or adjusted under 35 U.S.C. 154(b) by 1344 days.

(21) Appl. No.: 11/953,695

(22) Filed: Dec. 10, 2007

(65) Prior Publication Data
US 2008/0181505 A1 Jul. 31, 2008

(30) Foreign Application Priority Data

Jan. 15, 2007 (CN) .......................... 2007 1 0000960

(51) Int. Cl.
*G06K 9/34* (2006.01)
*G06K 9/72* (2006.01)
*G06K 9/54* (2006.01)
*G06K 9/60* (2006.01)

(52) U.S. Cl. ......... 382/177; 382/229; 382/306; 707/821

(58) Field of Classification Search .................. 382/177, 382/229–231, 305, 306; 707/821–831
See application file for complete search history.

(56) References Cited

U.S. PATENT DOCUMENTS

| | | | | |
|---|---|---|---|---|
| 5,768,451 A * | 6/1998 | Hisamitsu et al. | ............ | 382/309 |
| 5,821,929 A | 10/1998 | Shimizu et al. | | |
| 5,943,443 A | 8/1999 | Itonori et al. | | |
| 5,999,647 A * | 12/1999 | Nakao et al. | ................... | 382/187 |
| 6,125,204 A * | 9/2000 | Nakatsuka et al. | ........... | 382/173 |
| 6,721,451 B1 | 4/2004 | Ishitani | | |
| 6,721,463 B2 * | 4/2004 | Naoi et al. | ..................... | 382/305 |
| 6,879,951 B1 * | 4/2005 | Kuo | ................................ | 704/10 |
| 2002/0041713 A1 * | 4/2002 | Imagawa et al. | .............. | 382/229 |

(Continued)

FOREIGN PATENT DOCUMENTS

CN 1612154 A 5/2005

(Continued)

OTHER PUBLICATIONS

U.S. Office Action for corresponding U.S. Appl. No. 11/952,823, dated Mar. 15, 2012.

*Primary Examiner* — Aaron W Carter
(74) *Attorney, Agent, or Firm* — Birch, Stewart, Kolasch & Birch, LLP

(57) ABSTRACT

A headline-region initial processing section clips a headline-region image in an image document, divides the image into individual character images, and extracts features of the individual character images. Based on the features, a candidate-character-sequence generating section selects N (N is an integer more than 1) character images as candidate characters in the order of degree of matching from a font-feature dictionary for storing features of individual character images, and generates M×N index matrix where M is the number of characters in an extracted character sequence. Based on the index matrix, a document-name generating section generates a meaningful document name according to the image document. An image-document-DB management section manages accumulated image documents using the document name. This provides an image document processing device and an image document processing method each allowing automatically generating and managing the meaningful document name that represents the contents of the image document, without user's operation.

9 Claims, 17 Drawing Sheets

U.S. PATENT DOCUMENTS

| | | |
|---|---|---|
| 2006/0039045 A1 | 2/2006 | Sato et al. |
| 2006/0062492 A1 | 3/2006 | Masuichi et al. |

FOREIGN PATENT DOCUMENTS

| | | |
|---|---|---|
| CN | 1658192 A | 8/2005 |
| CN | 1738352 A | 2/2006 |
| CN | 1746884 A | 3/2006 |
| JP | 7-152774 | 6/1995 |
| JP | 8-153110 A | 6/1996 |
| JP | 8-272811 A | 10/1996 |
| JP | 9-319747 A | 12/1997 |
| JP | 10-74250 A | 3/1998 |
| JP | 2000-181994 A | 6/2000 |
| JP | 2001-344562 A | 12/2001 |
| JP | 2005-135041 | 5/2005 |
| JP | 2005-275849 A | 10/2005 |
| JP | 2006-85582 A | 3/2006 |

* cited by examiner

SEARCH KEYWORD INCLUDES R NUMBER OF CHARACTERS: C1, C2, ..., Cr
INDEX MATRIX IS M*N MATRIX, SIMILARITY VALUE MATRIX IS Weight AND HAS M*N DEGREES, Weight [i][j] INDICATES SIMILARITY VALUE IN CASE WHERE Index [i][j] IS MATCHED
SIMILARITY-DEGREE-WEIGHTING FACTOR Q FOR ROWS
SIMILARITY DEGREE FOR MATCHED CHARACTER IS W1, W2, ..., Wr

+

102 if:

C1, C2, ..., Cr ARE MATCHED AT LOCATIONS
[C1i, C1j], [C2i, C2j], ..., [Cri, Crj], RESPECTIVELY, IN INDEX MATRIX
AND
C(k+1)i = Cki+1, C(m+1)i = Cmi + 1 (m>k)    ...(1)

‖

103 then:

W1 = Weight[C1i][C1j], W2 = Weight[C2i][C2j], ..., Wr = Weight[Cri][Crj]
SIMILARITY DEGREE BETWEEN SEARCH KEYWORD AND INDEX MATRIX IS
SimDegree = W1 + W2 + ... + W(k-1) + Q*(Wk + W(k+1)) + ... + W(m-1) +
            Q*(Wm + W(m+1)) + ... + Wr    ...(2)

KA 去神仙居住的地方

FOR EXAMPLE,
SIMILARITY-DEGREE MATRIX Weight HAS M*N DEGREES,
Weight[i] = [1, 1-1/N, 1-2/N, ..., 1/N]
(i = 0, 1, ..., M-1),
AND SIMILARITY-DEGREE-WEIGHTING FACTOR Q FOR ROWS IS SET  ~104

THERefore,
SIMILARITY VALUE FOR "神" IS (1-1/N)
AND SIMILARITY VALUE FOR "仙" IS (1)  ~105

WEIGHTING

THEREFORE,
SIMILARITY DEGREE BETWEEN "神仙" AND "KA" IS
SimDegree = ((1-1/N) + 1)*Q  ~106

Semantic Analysis Method
Language Model

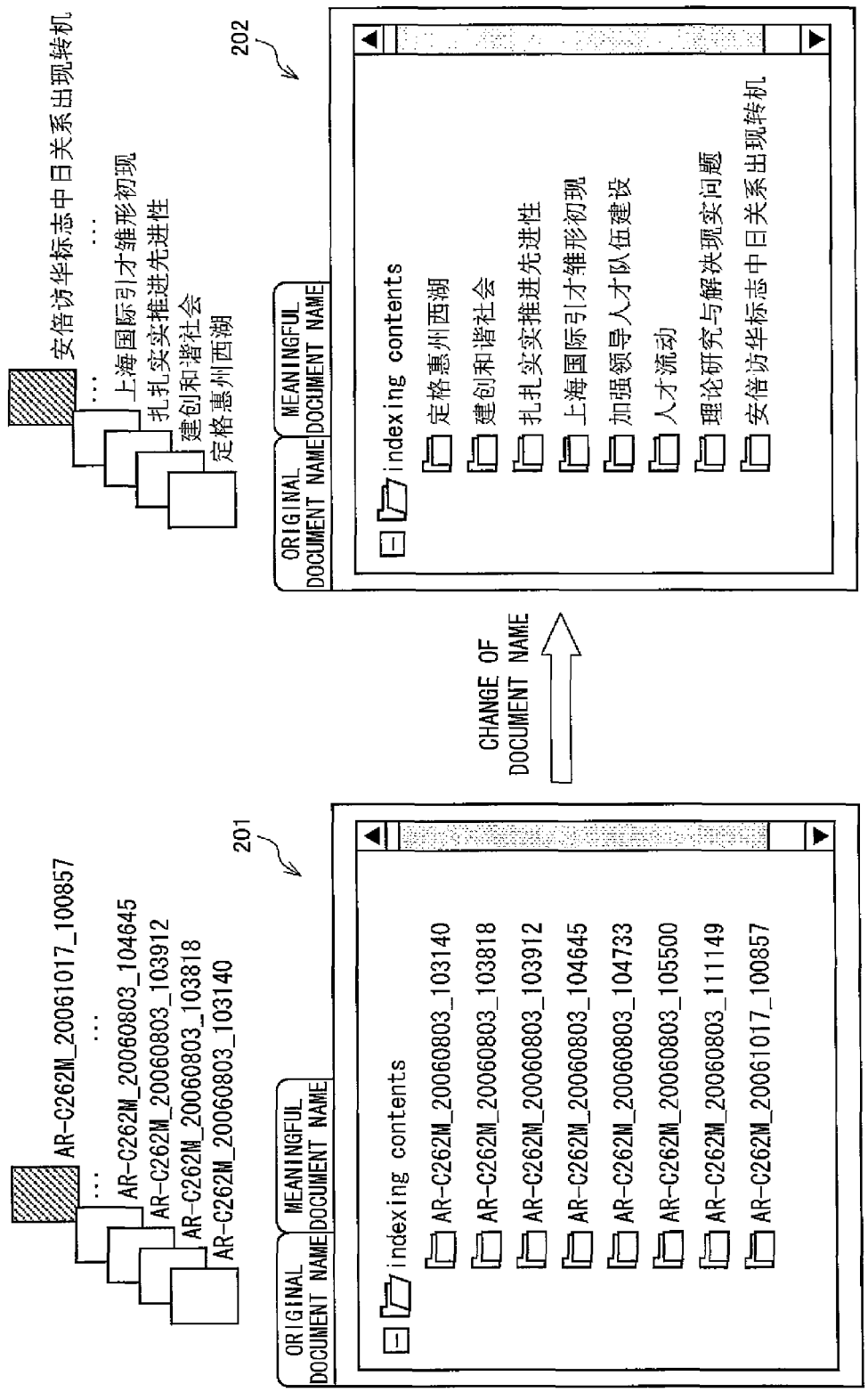

IMAGE DOCUMENT PROCESSING DEVICE, IMAGE DOCUMENT PROCESSING METHOD, PROGRAM, AND STORAGE MEDIUM

This non-provisional application claims priority under 35 U.S.C. §119(a) on Patent Application No. 200710000960.8 filed in The People's Republic of China on Jan. 15, 2007, the entire contents of which are hereby incorporated by reference.

FIELD OF THE INVENTION

The present invention relates to an image document processing device and an image document processing method, each of which allows reception of a document as an image and storage of the image. In particular, the present invention relates to an image document processing device and an image document processing method having a function of automatically generating a document name for an input image document and managing the image document.

BACKGROUND OF THE INVENTION

A document-filing device electronically accumulates documents by converting the documents into images by use of an image input device such as an image scanner, allowing a user to search for a document later. The document-filing device has been put into practical use.

Accumulated image documents are given document names so as to facilitate management of the image documents. Examples of a conventional technique for automatically giving a document name to image data include the specifications of Chinese Patent Application Publications No. CN1746884A and No. CN1658192A.

Chinese Patent Application Publication No. CN1746884A describes generating a document name based on (i) a date as data indicative of the time when the document is captured and (ii) a number indicative of the order in which the document is captured on the date.

Further, Chinese Patent Application Publication No. CN1658192A describes that specific information indicative of a location where a document is captured (e.g. "at X's house") is added by manual input of a user to data indicative of the time when the document is captured, the addition being made based on location information (such as longitude and latitude) indicative of the location where the document is captured.

However, an object of the conventional technique is to generate document names that are different with respect to each image document, and accordingly the document names do not reflect the contents of the image documents. Consequently, the user cannot know the contents of the image document based on its document name. A user must open an image document file in order to know the contents of the image document file.

SUMMARY OF THE INVENTION

An object of the present invention is to provide an image document processing device and an image document processing method for automatically generating a meaningful document name that represents the contents of an image document and managing the image document, without requesting user's operation.

In order to achieve the object, the image document processing device of the present invention is an image document processing device for giving a document name to each of accumulated image documents and managing the image documents, the image document processing device including: a font-feature dictionary for storing features of images of individual characters; a headline clipping section for clipping a headline region included in an input image document; an image-feature extracting section for dividing an image of a character sequence included in the headline region into images of individual characters and extracting features of the images of individual characters; a candidate-character-sequence generating section for selecting, as candidate characters, images of characters each having high degree of matching of features based on the features of the images of individual characters that have been extracted by the image-feature extracting section and with reference to the font-feature dictionary, so as to generate a candidate character sequence corresponding to the character sequence, the candidate-character-sequence generating section adjusting the candidate characters included in the candidate character sequence through a semantic analysis method so as to generate a meaningful candidate character sequence; and a document-name generating section for generating a first document name for the input image document, the first document name including the meaningful candidate character sequence generated by the candidate-character-sequence generating section.

With the arrangement, the headline clipping section specifies a headline region in an image document and clips a character sequence in the headline region, i.e. a headline. Then, the image-feature extracting section divides an image of the extracted character sequence (headline) into images of individual characters and extracts features of the images of individual characters.

Subsequently, the candidate-character sequence generating section selects, as candidate characters, images of characters having high degree of matching of features based on the features of the images of individual characters and with reference to the font-feature dictionary, so as to generate a candidate character sequence corresponding to the character sequence. Because the candidate character sequence has features similar to those of the character sequence in the headline region, there is a case that the candidate character sequence is equal to the character sequence in the clipped headline region and makes sense.

However, because matching is performed based on features of a font, there is a possibility that a character in the candidate character sequence is a different character whose shape is similar to that of a character in the character sequence in the headline region. For that reason, the candidate-character-sequence generating section adjusts candidate characters included in the candidate character sequence through a semantic analysis method so as to generate a meaningful candidate character sequence. This allows obtaining, with a high probability, a candidate character sequence that has the same characters and the same meaning as the headline in the clipped headline region.

With respect to the input image document, the document-name generating section generates a document name (first document name: meaningful document name) including the meaningful candidate character sequence generated by the candidate-character-sequence generating section. The image document is managed by use of the document name.

This allows automatically giving meaningful document names to accumulated image documents without requiring user's operation. Consequently, the user can browse the accumulated image documents by use of document names representing the contents of the image documents, and can easily manage and search the accumulated image documents.

Further, in order to achieve the object, the image document processing method of the present invention is an image document processing method for giving a document name to each of accumulated image documents and managing the image documents, the image document processing method including the steps of: (i) clipping a headline region included in an input image document; (ii) dividing an image of a character sequence included in the headline region into images of individual characters and extracting features of the images of individual characters; (iii) selecting, as candidate characters, images of characters each having high degree of matching of features based on the features of the images of individual characters that have been extracted in the step (ii) and with reference to a font-feature dictionary for storing features of images of individual characters, so as to generate a candidate character sequence corresponding to the character sequence, and adjusting the candidate characters included in the candidate character sequence through a semantic analysis method so as to generate a meaningful candidate character sequence; and (iv) generating a first document name for the input image document and managing the image document, the first document name including the meaningful candidate character sequence.

As already described in the explanation of the image document processing device of the present invention, this allows automatically giving meaningful document names to accumulated image documents without requiring user's operation. Consequently, the user can browse the accumulated image documents by use of document names representing the contents of the image documents, and can easily manage and search the accumulated image documents.

For a fuller understanding of the nature and advantages of the invention, reference should be made to the ensuing detailed description taken in conjunction with the accompanying drawings.

BRIEF DESCRIPTION OF THE DRAWINGS

FIG. 12 is an explanatory drawing for illustrating a method in which the search section calculates similarity-degree between a search keyword and an index matrix.

FIG. 17 is an explanatory drawing for illustrating a browsing window for image documents stored in an image document DB, the browsing window being displayed on an image document display section.

DESCRIPTION OF THE EMBODIMENTS

The present invention relates to automatic generation of a meaningful and suitable document name for an image document on the basis of recognition of features of images and matching of the images. As a more preferable embodiment, the following discloses a method and a device each of which allows generation of index information of image documents based on headline regions of the image documents and allows generating a meaningful document name that reflects the contents of the image documents based on the index information.

The following explains one embodiment of the present invention with reference to FIGS. 1 to 17. The present invention is not limited to this embodiment.

Figure 2:
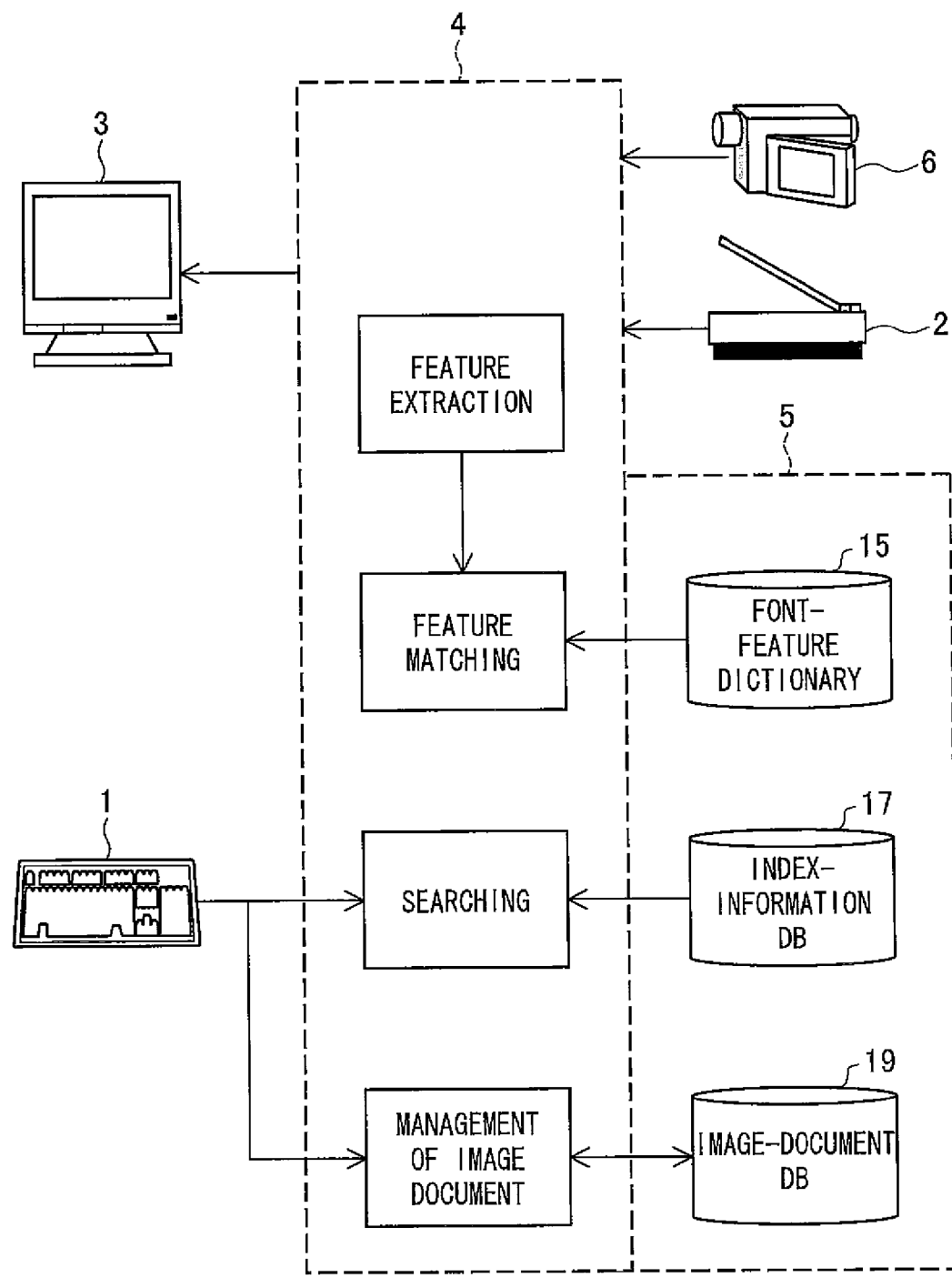
FIG. 2 is a block diagram of the image document processing device.

FIG. 2 is a block diagram of an image document processing device of the present embodiment. In FIG. 2, a reference numeral 1 indicates a keyboard used for input of a search keyword and change of set values such as the number of candidate characters, a similarity value, and a similarity-degree weighting factor Q for rows. These set values will be explained later. Further, the keyboard 1 is used for inputting instructions at a time when a user browses accumulated image documents.

A reference numeral 2 indicates an image scanner for acquiring an image document. Note that, acquisition of an image document is performed not only by the image scanner 2, but also by communication via a network etc. Further, the image scanner 2 can receive an input of a search keyword.

A reference numeral 6 is a digital image capture device such as a digital camera. This acquires an image document, too.

A reference numeral 3 indicates a display device for outputting and displaying a searched image document. Examples of what is displayed include information of similarity-degree and information of the name of an image. Further, the display device 3 displays a browsing window that allows browsing of accumulated image documents.

A reference numeral 4 indicates a processor for performing (i) an image-document-feature extracting process for extracting from an image document a headline region that serves as a key for searching, (ii) an index-information generating process for generating index information that allows searching of an image document, and (iii) a searching process based on the generated index information (iv) an image document management process for generating a meaningful document name (mentioned later) by using the index information so as to manage an image document. A reference numeral 5 is an external storage device for storing software etc. with which the processor 4 performs the above processes.

The above processes are performed by the processor 4 executing the software stored in the external storage device 5. An example of the processor 4 is a main body of a general computer. In the present embodiment, the processor 4 also performs a font-feature-dictionary generating process for generating a later-mentioned font-feature dictionary 15 (see FIG. 1) that is used in the index-information-generating process.

The external storage device 5 may be a hard disc etc. that allows fast access. The external storage device 5 may be a high-capacity device such as an optical disc in order to store a large amount of image documents.

The external storage device 5 constitutes the font-feature dictionary 15, an index-information database 17, an image-document database 19, a font-sample database 13, and a language model 61 etc. that will be mentioned later.

Figure 1:
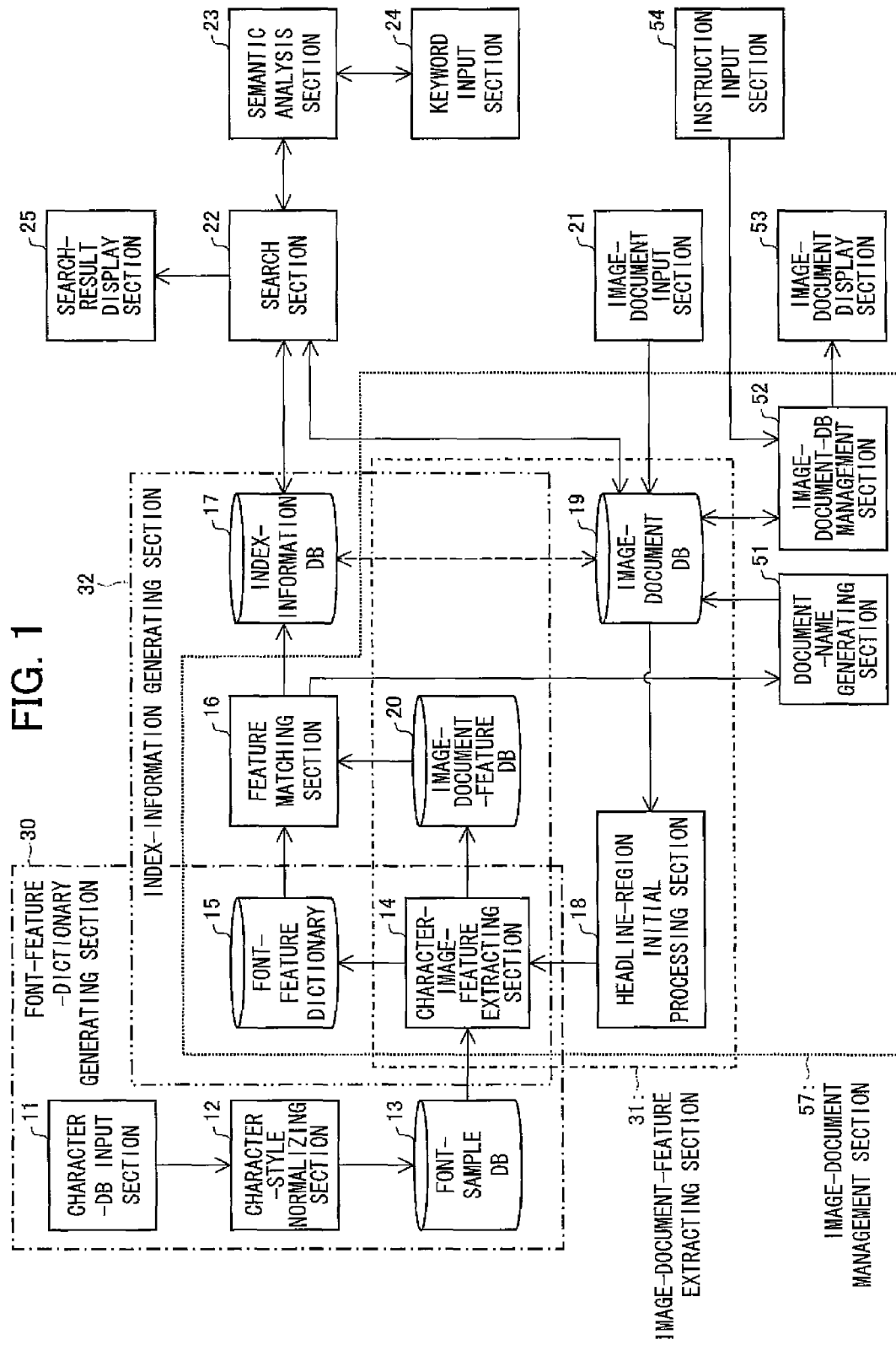
FIG. 1 is a functional block diagram of an embodiment of the present invention, illustrating a function of an image document processing device.

FIG. 1 is a functional block diagram of the embodiment of the present invention, illustrating a function of an image document processing device.

As illustrated in FIG. 1, the image document processing device of the present embodiment includes a character-database input section (character-DB input section) 11, a character-style normalizing section 12, the font-sample database (font-sample DB) 13, a character-image-feature extracting section (image-feature-extracting section) 14, the font-feature dictionary 15, a feature-matching section (feature-matching section) 16, the index-information database (index-information DB) 17, a headline-region initial processing section (headline clipping section) 18, the image-document database (image document DB) 19, an image-document-feature database (image-document-feature DB) 20, an image-document input section 21, a search section 22, a semantic analysis section 23, a keyword input section 24, a search-result display section 25, a document-name generating section 51, an image-document DB management section 52, an image-document display section 53, and an instruction input section 54.

Among them, the character-DB input section 11, the character-style normalizing section 12, the font-sample DB 13, the character-image-feature extracting section 14, and the font-feature dictionary 15 constitute a font-feature-dictionary generating section 30 that performs the aforementioned font-feature dictionary generating process.

The following explains the functional blocks 11, 12, 13, 14, and 15 that constitute the font-feature-dictionary generating section 30.

The character-DB input section 11 is a section to which is input a basic character database necessary for generating the font-feature dictionary 15. In a case where the device of the present invention can deal with Chinese language, all of 6763 characters according to GB2312 in the People's Republic of China and the like are input to the character-DB input section 11. In a case where the device of the present invention can deal with Japanese language, approximately 3000 characters according to JIS level-1 and the like are input to the character-DB input section 11. The character-DB input section 11 includes the processor 4, and a character database is supplied via a storage medium or a network etc.

The character-style normalizing section 12 generates character images having different fonts for all characters included in the character database having been input to the character-DB input section 11. The character images having different fonts are stored in the font-sample DB 13.

Figure 3:
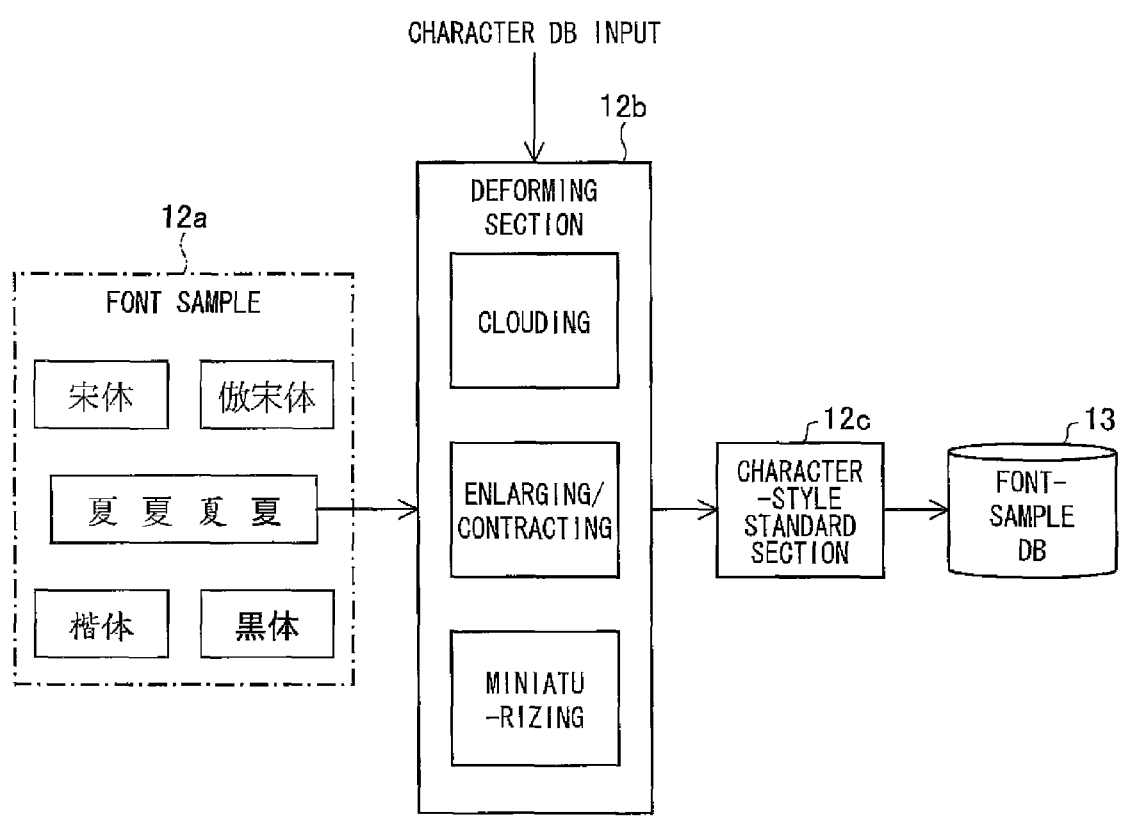
FIG. 3 is an explanatory drawing for illustrating a process in which the image document processing device generates a font-sample database.

FIG. 3 illustrates a process in which the character-style normalizing section 12 generates the font sample DB 13. In the case where the device of the present invention can deal with Chinese language, the character-style normalizing section 12 includes a font sample 12a such as Song typeface (宋体), imitated Song typeface (仿宋体), Hei typeface (黑体), and regular script (楷体). In the case where the device of the present invention can deal with Japanese language, the character-style normalizing section 12 includes a font sample such as MS Min typeface and MS gothic typeface.

A deforming section 12b of the character-style normalizing section 12 makes characters of the character database be images, and standardize the character images. Then, referring to the font sample 12a, the deforming section 12b deforms the character images having been standardized and thus makes them be character images having further different fonts. Examples of deforming include clouding, enlarging/contracting, and miniaturizing. Character images having been subjected to such deforming are caused by a character-style standard section 12c to be stored in the font sample DB13 as standard character images.

The font sample DB 13 stores standard character images for each of all characters included in the character database. Each character is provided with plural standard character images that are different with respect to each font determined by its character style and character size. For example, a character "中" is provided with plural standard character images "中" that are different in their shapes according to predetermined character-styles, and that are different in their sizes according to predetermined sizes.

The character-image-feature extracting section 14 extracts the feature of a character image (image feature) and stores the feature in the font-feature dictionary 15. In the present embodiment, the character-image-feature extracting section 14 extracts the features of a character image on the basis of a combination of (i) the feature of a periphery of a character image and (ii) the feature of a grid direction, and the character-image-feature extracting section 14 regards the features of a character image as feature vectors. The features of a character image are not limited to these. Other features may be extracted and regarded as feature vectors.

Figure 4:
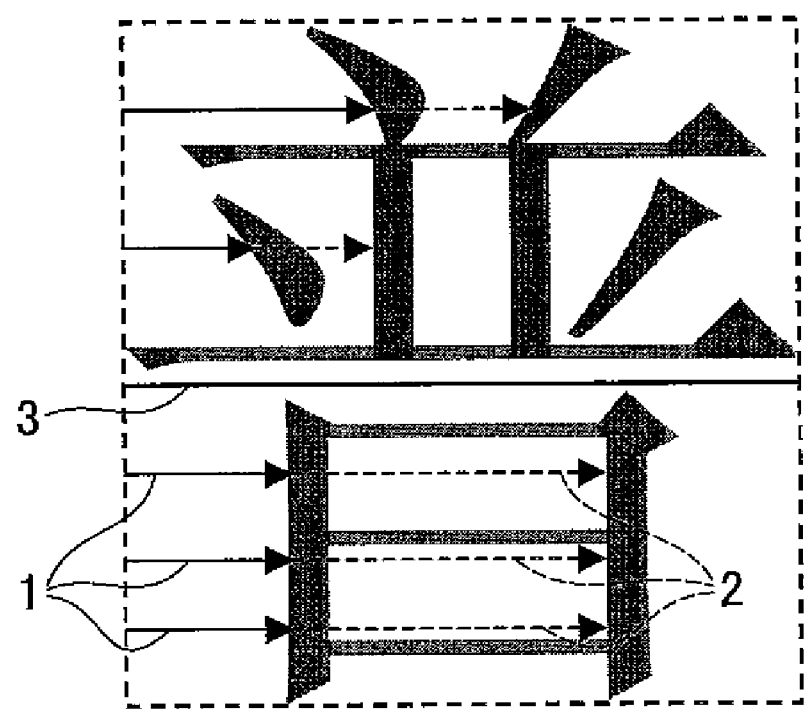
FIG. 4 is an explanatory drawing for illustrating a feature of a periphery of a character image.

The following explains (i) the feature of a periphery of a character image and (ii) the feature of a grid direction. FIG. 4 is an explanatory drawing for illustrating the feature of a periphery of a character image. The feature of a periphery of a character image is a feature of a periphery seen from the outside of the character image. As illustrated in FIG. 4, a character image is scanned from four sides of a rectangle surrounding the character image, and a distance from the side to a point where a white pixel changes to a black pixel is regarded as a feature, and a position where a first change from a white pixel to a black pixel occurs and a position where a second change from a white pixel to a black pixel occurs are extracted.

For example, in a case where a rectangle surrounding a character image is divided into X rows and Y columns, the character image is scanned from a left direction and from a right direction with respect to each row, and the character image is scanned from an upper direction and from a lower direction with respect to each column. FIG. 4 illustrates scanning of the character image from the left with respect to each row.

Further, in FIG. 4, a full-line arrow 1 indicates a scanning track from a side of the surrounding rectangle to a point where a first change from a white pixel to a black pixel occurs. A broken-line arrow 2 indicates a scanning track from a side of the surrounding rectangle to a point where a second change from a white pixel to a black pixel occurs. A full-line arrow 3 indicates a scanning track on which a point where a change from a white pixel to a black pixel occurs is not detected. In the case of the full-line arrow 3, a distance value is 0.

Figure 5:
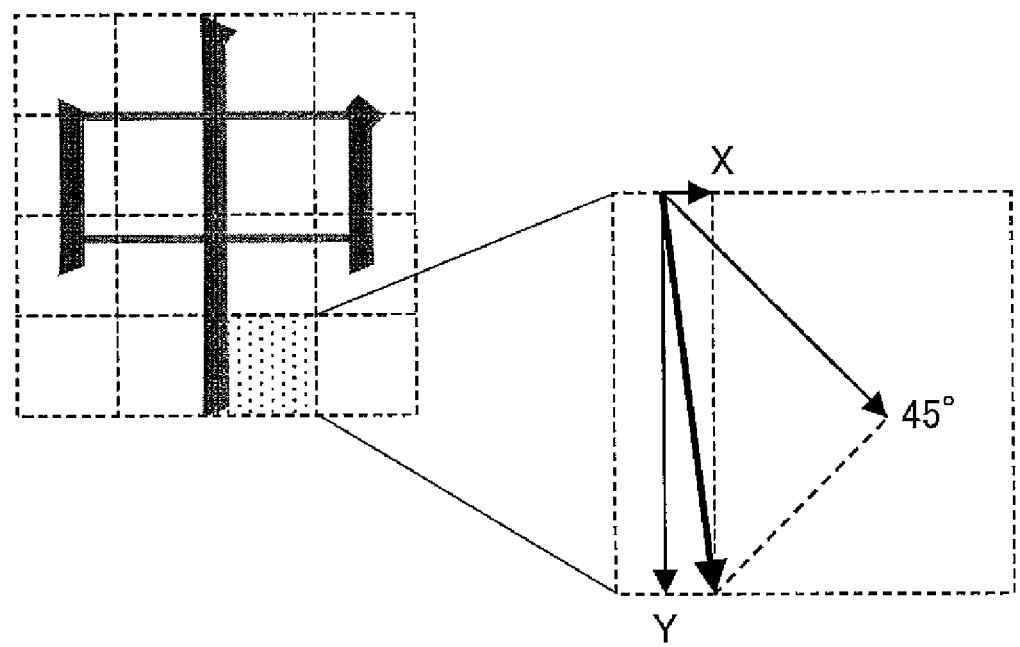
FIGS. 5(a) and 5(b) are explanatory drawings each for illustrating a feature of a grid direction.
Figure 5:
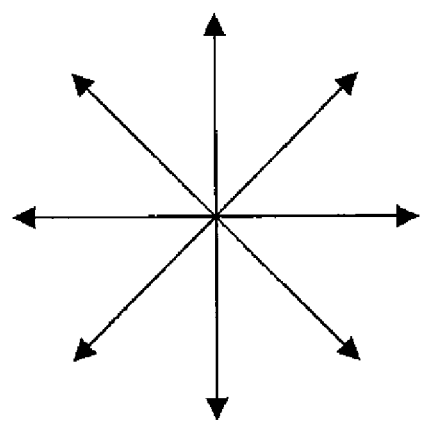

On the other hand, FIGS. 5(*a*) and 5(*b*) are explanatory drawings for illustrating the feature of a grid direction. A character image is divided into a rough grid and black pixels in each grid unit are searched for in predetermined directions. The number of black pixels that are connected in individual directions is counted, and direction contributivity indicative of how the black pixels are distributed in individual directions is calculated by dividing a distance value by a value corresponding to a difference in the number of the black pixels, with a Euclidean distance being a discrimination function.

In FIG. 5(*a*), the character image is divided into a grid having 16 (4×4) grid units, and black pixels are searched for in three directions, i.e. an X-axis direction (0°), a 45° direction, and a Y-axis direction (90°) from a point at which a black pixel changes to a white pixel and which is nearest to a crossing point of grid lines in the X-direction.

In the present example, a character image is divided into a grid having 8×8 grid units, and black pixels are searched for in eight directions, i.e. 0°, 45°, 90°, 135°, 180°, 225°, 270°, and 315° directions as illustrated in FIG. 5(*b*).

The method for extracting the feature of a grid direction differs in terms of a direction of searching and in terms of a point from which searching is performed. Examples of the method are described in Japanese Unexamined Patent Publication No. 2000-181994 (Tokukai 2000-181994) etc.

The character-image-feature extracting section 14 extracts the features of all the standard character images that are stored in the font-sample DB 13. The character-image-feature extracting section 14 stores, in the font-feature dictionary 15, the result of extraction of the standard character images stored in the font-sample DB 13, and thus generates the font-feature dictionary 15.

Figure 6:
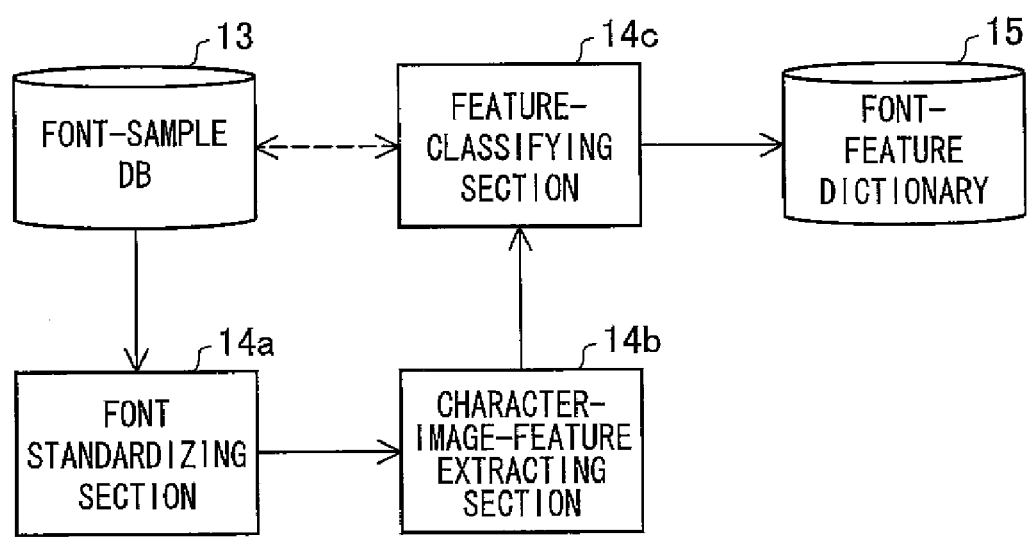
FIG. 6 is an explanatory drawing for illustrating a process in which the image document processing device generates a font-feature dictionary.

FIG. 6 illustrates a process in which the character-image-feature extracting section 14 generates the font-feature dictionary 15. In the character-image-feature extracting section 14, a font standardizing section 14*a* extracts a standard character image from the character-feature-sample DB 13 and a character-image-feature extracting section 14*b* extracts the feature of the standard character image extracted by the font-standardizing section 14*a*. Referring to the font-sample DB 13, a feature-classifying section 14*c* classifies the feature of each standard character image, and stores the feature in the font-feature dictionary 15.

As described above, the character-image-feature extracting section 14*b* calculates suitable values of the features of differently weighted standard character images with respect to each character, and thus obtains standard features of the standard character images.

The character-image-feature extracting section 14*b* can generate different character-image-feature dictionaries by weighting different character styles and character sizes. By mixing image features of plural character styles and generating a font-feature dictionary with respect to each character-image-feature, it is possible to make automatic indexing and managing of an image document including plural character styles and plural character sizes in a satisfactory manner.

The following explains the image-document DB 19, the image-document-feature DB 20, the headline-region initial processing section (headline clipping section) 18, and the character-image-feature extracting section 14 that constitute an image-document-feature extracting section 31 for performing the image-document-feature extracting process.

When an image document is supplied from the image document input section 21 to the image-document DB 19, the image-document DB 19 assigns, to the image document, a document ID for identification and stores the image document.

When a new image document is stored in the image-document DB 19, the headline-region initial processing section 18 specifies and clips a headline region in the image document based on the image data, and transmits a character image to the character-image-feature extracting section 14.

Figure 9:
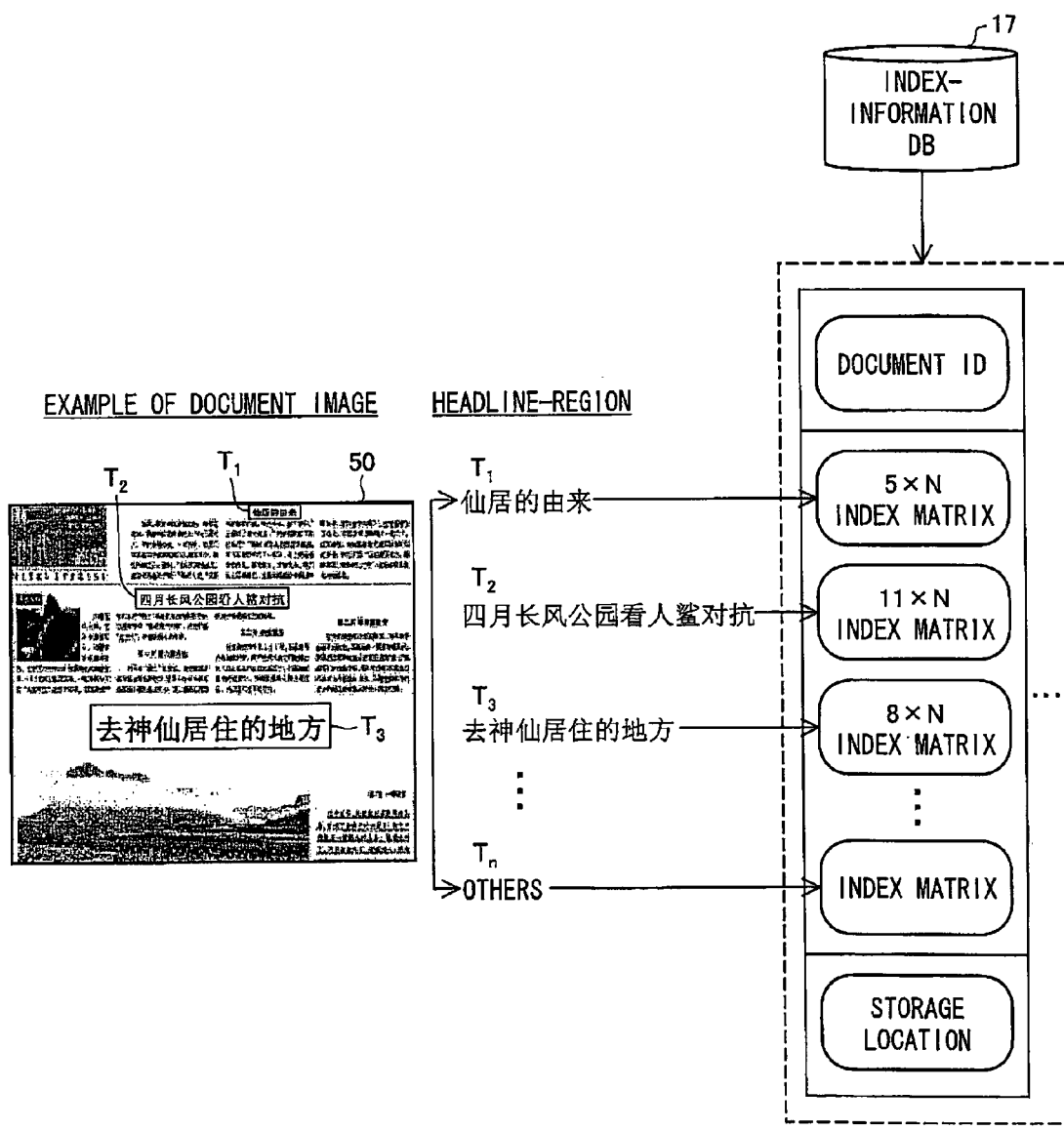
FIG. 9 is an explanatory drawing for illustrating: an example of an image document; and an example of data disposition of index information of the image document in an index-information database.

FIG. 9 illustrates a state where three regions T1, T2, and T3 are specified as headline regions in an image document 50. As illustrated in FIG. 9, title portions in the image document 50 are extracted as a headline region T.

The character image clipped by the headline-region initial processing section 18 and sent to the character-image-feature extracting section 14 is generally an image of a character sequence including plural characters. Accordingly, hereinafter, an explanation will be made as to a case where the character image sent from the headline-region initial processing section 18 is an image of a character sequence.

In the present embodiment, the headline-region initial processing section 18 specifies and clips the headline region T through a projective method and a statistical analysis of connected regions. The headline region T mainly corresponds to a title portion. The headline region T may be specified and extracted through various conventional methods that are described in Japanese Unexamined Patent Publication No. 1997-319747 (Tokukaihei 9-319747) and Japanese Unexamined Patent Publication No. 1996-153110 (Tokukaihei 8-153110).

As described above, only the headline region T such as a title portion is specified and extracted, and whole character regions (text regions) in an image document are not specified and extracted. This allows reducing the amount of information to be searched and shortening the time for searching.

However, specifying only a headline region T such as a title portion without specifying whole text regions is not necessarily required in the present embodiment. That is, whole text regions may be specified and extracted. However, as for generation of a meaningful document name (mentioned later), specifying only a headline region T is essential.

The character-image-feature extracting section 14 divides an image of a character sequence input from the headline-region initial processing section 18 into images of individual characters, and then extracts the features of the images of individual characters as with the case of generating the font-feature dictionary 15. The extracted features are stored in the image-document-feature DB 20 with respect to each image document.

Information indicative of the features of an image of a character sequence included in the headline region T clipped by the headline-region initial processing section 18 is stored in the image-document-feature DB 20 as features (feature vectors) of individual characters that constitute the character sequence.

As illustrated in FIG. 9, with respect to the image document 50, the features of character images of individual character sequences included in whole headline regions T1, T2, and T3 . . . having been extracted, i.e. the features of images of characters that constitute individual character sequences are stored with the document ID of the image document 50.

The following explains the character-image-feature extracting section 14, the font-feature dictionary 15, the feature-matching section 16, the index-information DB 17, and the image-document-feature DB 20 that constitute an index-information generating section 32 that performs the index-information generating process.

Functions of the character-image-feature extracting section 14, the font-feature dictionary 15, and the image-document-feature DB 20 have been already explained above.

The feature-matching section 16 reads out the features of the character images included in the headline region T of the image document from the image-document-feature DB 20, generates an index matrix (which will be mentioned later) based on the read-out features and with reference to the font-feature dictionary 15, and generates index information of the image document.

One index information is generated with respect to one image document, and an index matrix included in the index information is generated with respect to each headline region T. Therefore, when one image document includes plural headline regions T, index information of the image document includes plural index matrices.

Figure 7:
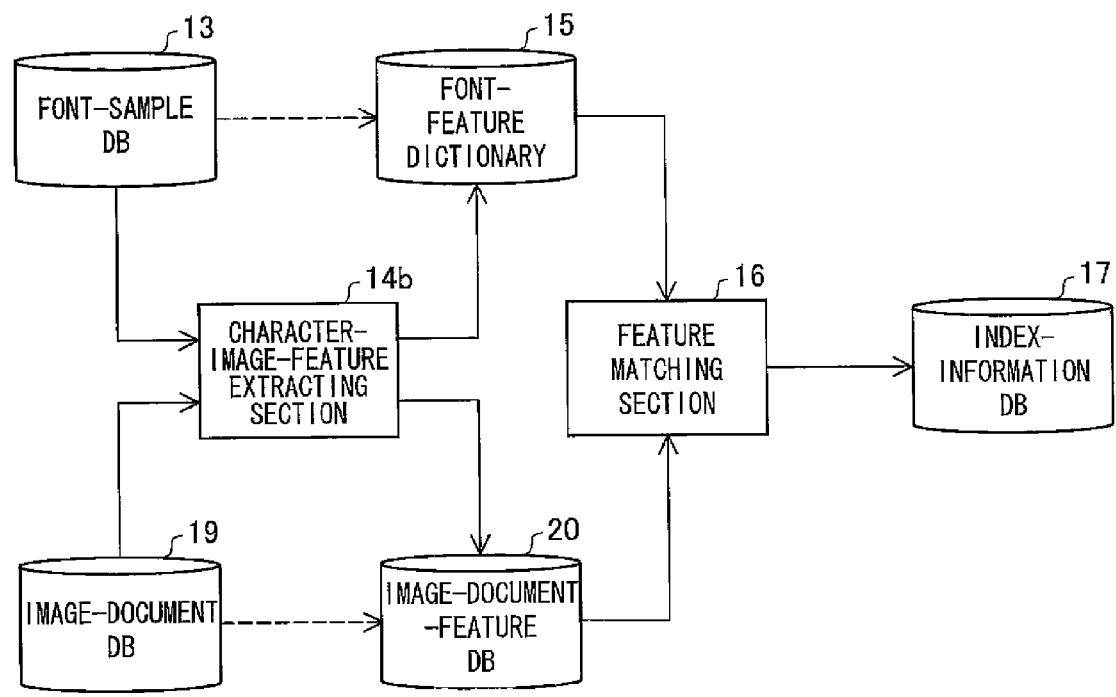
FIG. 7 is an explanatory drawing for illustrating a process in which the image document processing device generates an index-information database.

FIG. 7 illustrates a process for generating the index-information DB 17. As described above, when an image document is input and stored in the image-document DB 19, the character-image-feature extracting section 14b extracts the features of character images of a character sequence included in each headline region T, and stores the features in the image-document-feature DB 20.

The feature-matching section 16 reads out the features of the images of the character sequence included in each headline region T from the image-document-feature DB 20, matches each single character of the character sequence with a standard character image included in the font-feature dictionary 15, and generates an index matrix with respect to each headline region T.

The feature-matching section 16 adds, to each index matrix, other information of the image document such as a document ID and information indicative of a location where the image document is stored in the image-document DB 19, and thus generates index information, and stores the index information in the index-information DB 17.

Figure 8:
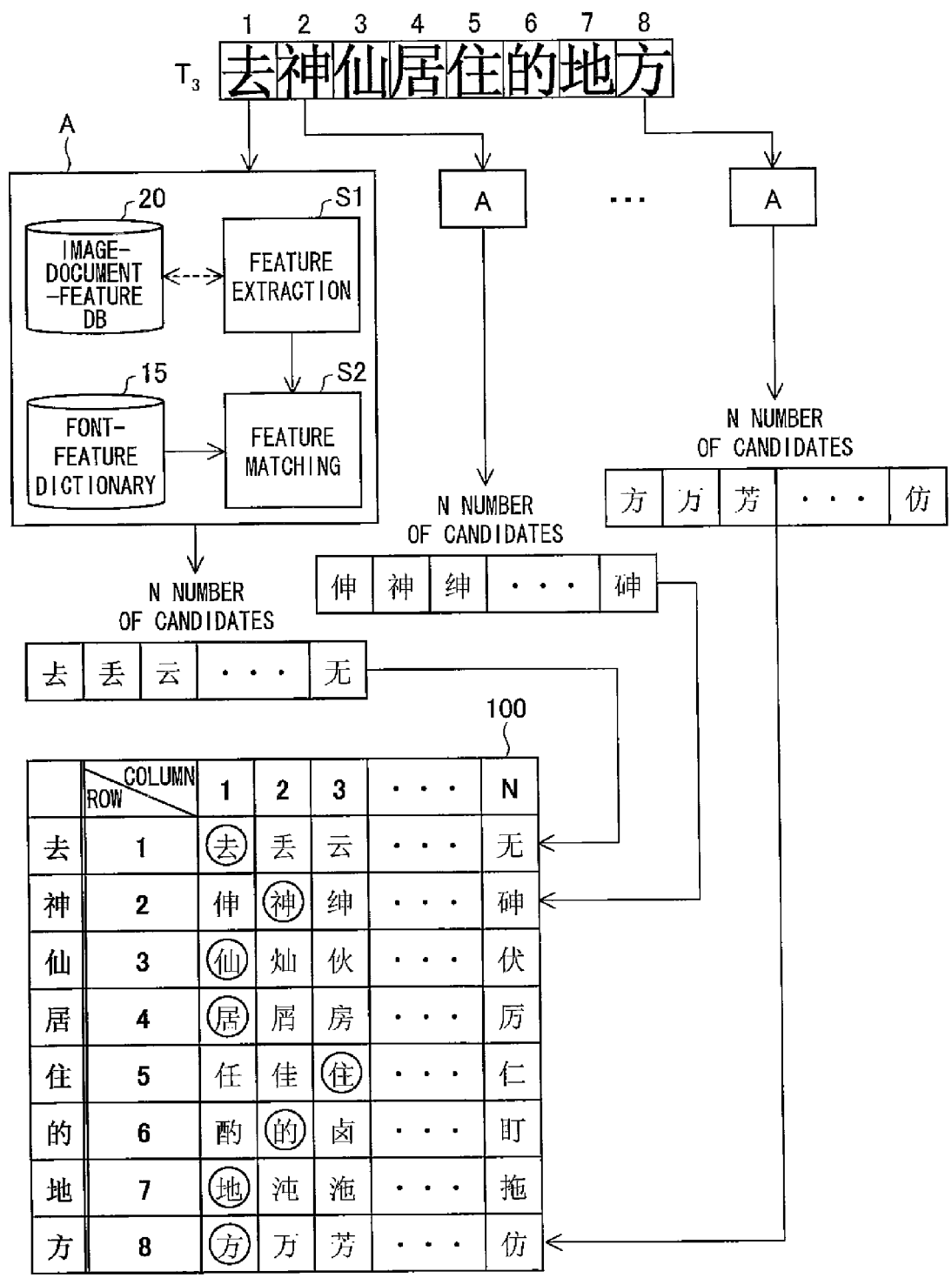
FIG. 8 is an explanatory drawing for illustrating a specific example of a process in which the image document processing device generates an index matrix.

FIG. 8 illustrates an example of a process in which the feature-matching section 16 generates an index matrix. FIG. 8 is an explanatory drawing for illustrating generation of an index matrix for eight character images included in a character sequence "去神仙居住的地方" that is included in the headline region T3 in FIG. 9.

The character sequence "去神仙居住的地方" is divided into single character images "去", "神", "仙", "居", "住", "的", "地", and "方". Such division may be performed through a conventional method.

The eight characters "去" ... "方" are given numbers 1 to 8, respectively, so that "去" is given 1, "本" is given 2, ..., and "方" is given 8. These numbers are regarded as row-numbers of the index matrix.

Each of the eight character images is subjected to a process as follows: the feature of the character image "去" is extracted from the image-document-feature DB 20 indicated by a reference sign A in FIG. 8 (S1), and N candidate characters are selected in the order of similarity of features (in the order of high degree of matching) with reference to the font-feature dictionary 15 (S2).

The N candidate characters having been extracted in the order of high degree of matching are given numbers corresponding to the order of extraction. The numbers are regarded as column-numbers of the index matrix. A character similarity value (similarity value) indicative of the degree of matching between a search character included in a search keyword and a candidate character is set according to the column-number.

A table indicated by a reference numeral 100 in FIG. 8 shows the contents of the index matrix of the character sequence "去神仙居住的地方". For example, with respect to the character image "住" that is a fifth character, candidate characters "任", "住", "住", ..., and "仁" are selected at a row of row-number 5 so that the character with the highest matching is positioned at a 1st column. In the table 100, for example, the position of the candidate character "去" in the index matrix is [1, 1], the position of the candidate character "屑" is [4, 2], and the position of the candidate character "仁" is [5, N].

In the table 100 in FIG. 8, candidate characters corresponding to individual characters of the character sequence are shown with a sign "○".

Row-number M of the index matrix is equal to the number of characters included in an image of a character sequence that is clipped as the headline region T by the headline-region initial processing section 18. Column-number N is equal to the number of candidate characters that are selected for one character. Accordingly, the present invention allows flexibly setting the number of elements in the index matrix, i.e. the number of candidate characters by changing the number of dimensions (number of columns) of the matrix index. Consequently, the present invention allows exact searching of an image document with little omissions.

How to store information of selected candidate characters in the index matrix is suitably determined according to how to input a search keyword. For example, in the case of inputting a search keyword via a keyboard 1, candidate characters are stored as information such as character codes, in order to perform searching based on the search keyword inputted via the keyboard.

In the case of inputting a search keyword as image data via an image scanner 2 etc., candidate characters are stored as information indicative of features (feature vectors), in order to perform searching by extracting the features of the search keyword (feature vectors) and comparing the feature vectors of the search keyword with the feature vectors of the candidate characters.

FIG. 9 illustrates an example of data disposition of index information in the index-information DB 17. In index information of the image document 50 in which headline regions T1, T2, T3, ..., and Tn exist, index matrices for the headline regions T1, T2, T3, ..., and Tn are disposed in a linear manner. In the example of FIG. 9, a document ID is disposed foremost, and thereafter the index matrices are disposed, and information indicative of a storage location is disposed at the end. In FIG. 9, "5×N" is a size of an index matrix and indicates 5 rows and N columns.

By disposing the index information as described above, it is possible to promptly specify the location where the image document is stored in the image-document DB 19 and the location where the headline region T exists in the image document, thereby using the image document and the headline region T for displaying the result of searching.

Further, it is possible to add other properties to the index information according to actual requests.

Figure 10:
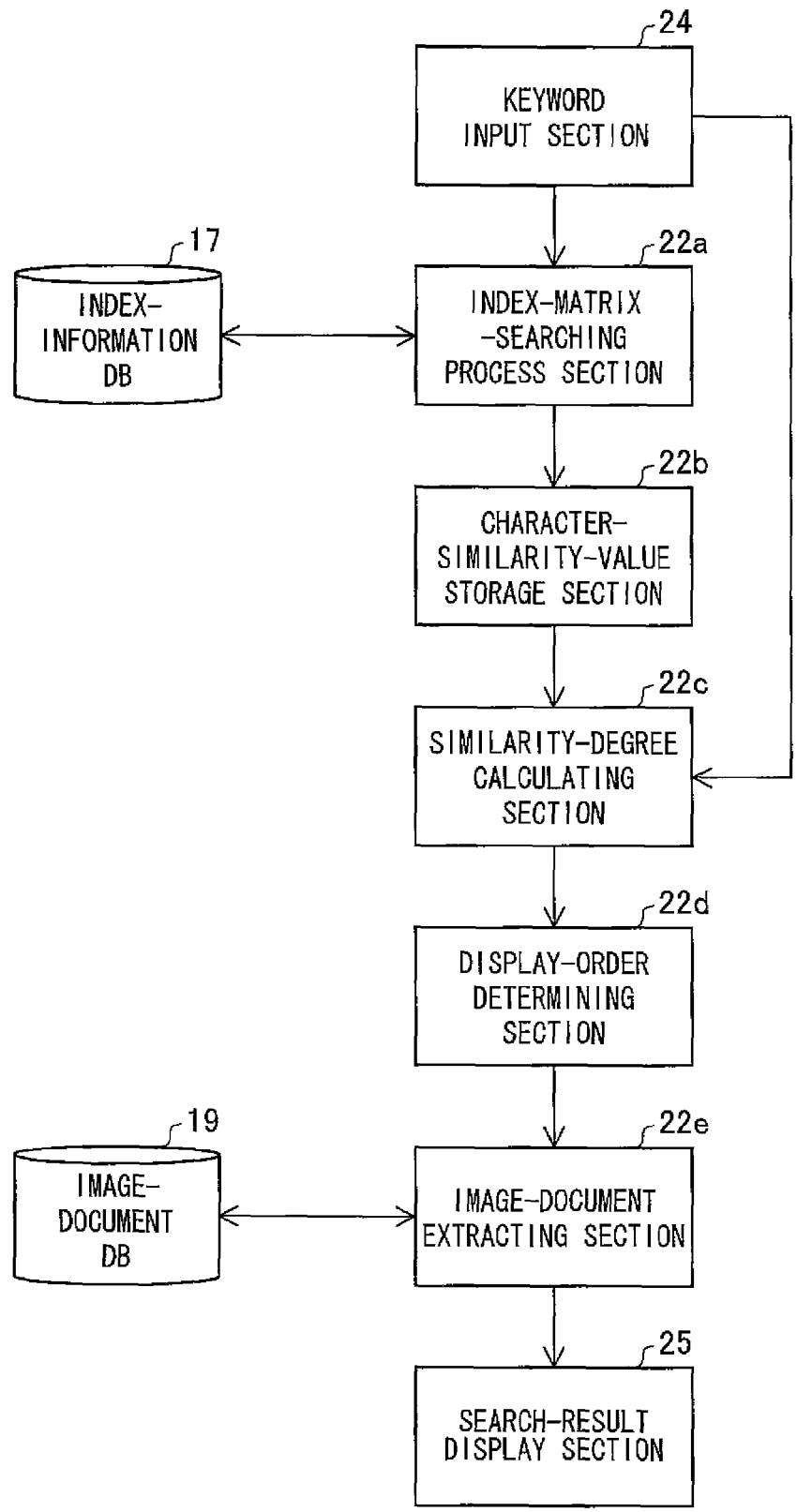
FIG. 10 is an explanatory drawing for illustrating a function of a search section and a search process.

The following explains a search section 22 for performing a searching process using index information. FIG. 10 is an explanatory drawing for illustrating the function of the search section 22 and the searching process. The search section 22 includes an index-matrix searching process section 22a, a character-similarity-value storage section (storage section) 22b, a similarity-degree calculating section 22c, a display-order determining section (order determining section) 22d, and an image-document extracting section 22e.

A search keyword is input from the keyword input section 24 to the index-matrix searching process section 22a. Examples of the keyword input section 24 include the keyboard 1 and the image scanner 2.

The index-matrix searching process section 22a searches the index-information DB 17 in order to detect an index matrix that includes the input search keyword. The index-matrix searching process section 22a divides the search keyword into individual search characters, and searches for an index matrix that includes a search character. When there exists an index matrix that includes a search character, the index-matrix searching process section 22a acquires information indicative of a location where the search character is matched with a candidate character in the index matrix. An example of a procedure for extracting the index matrix will be explained later using a flowchart in FIG. 11.

The character-similarity-value storage section 22b stores: information indicative of a matching position acquired by the index-matrix searching process section 22a; and a character-similarity value according to a column-number of the matching position.

After the index-matrix searching process section 22a detects all index matrices, the similarity-degree calculating section 22c calculates the degree of similarity between the detected index matrices and the search keyword.

Calculation of the degree of similarity is performed through a predetermined similarity-degree calculating method by using information indicative of the matching position and the character-similarity value that is stored in the character-similarity-value storage section 22b. Calculation of the degree of similarity will be explained later with reference to FIGS. 12 and 13.

In the present embodiment, the character-similarity-value storage section 22b stores information indicative of the matching position and the character-similarity value according to the column-number of the matching position. However, the present invention may be arranged so that the character-similarity-value storage section 22b stores only the information indicative of the matching position, and the similarity-degree calculating section 22c acquires the character-similarity value from the information indicative of the matching position.

The display-order determining section 22d determines the order of display on the basis of information indicative of similarity-degree calculated by the similarity-degree calculating section 22c. The display-order determining section 22d determines the order of display so that the search-result display section 25 displays image documents sequentially from an image document having an index matrix with high similarity-degree.

The image-document extracting section 22e reads out image data of image documents from the image-document DB 19 so that image documents are displayed in the order determined by the display-order determining section 22d. Then, the image-document extracting section 22e outputs the image data to the search-result display section 25, and the search-result display section 25 displays the image documents.

The search-result display section 25 displays the image documents according to the order of display. The display may be thumbnail display. An example of the search-result display section 25 is the display device 3.

Figure 11:
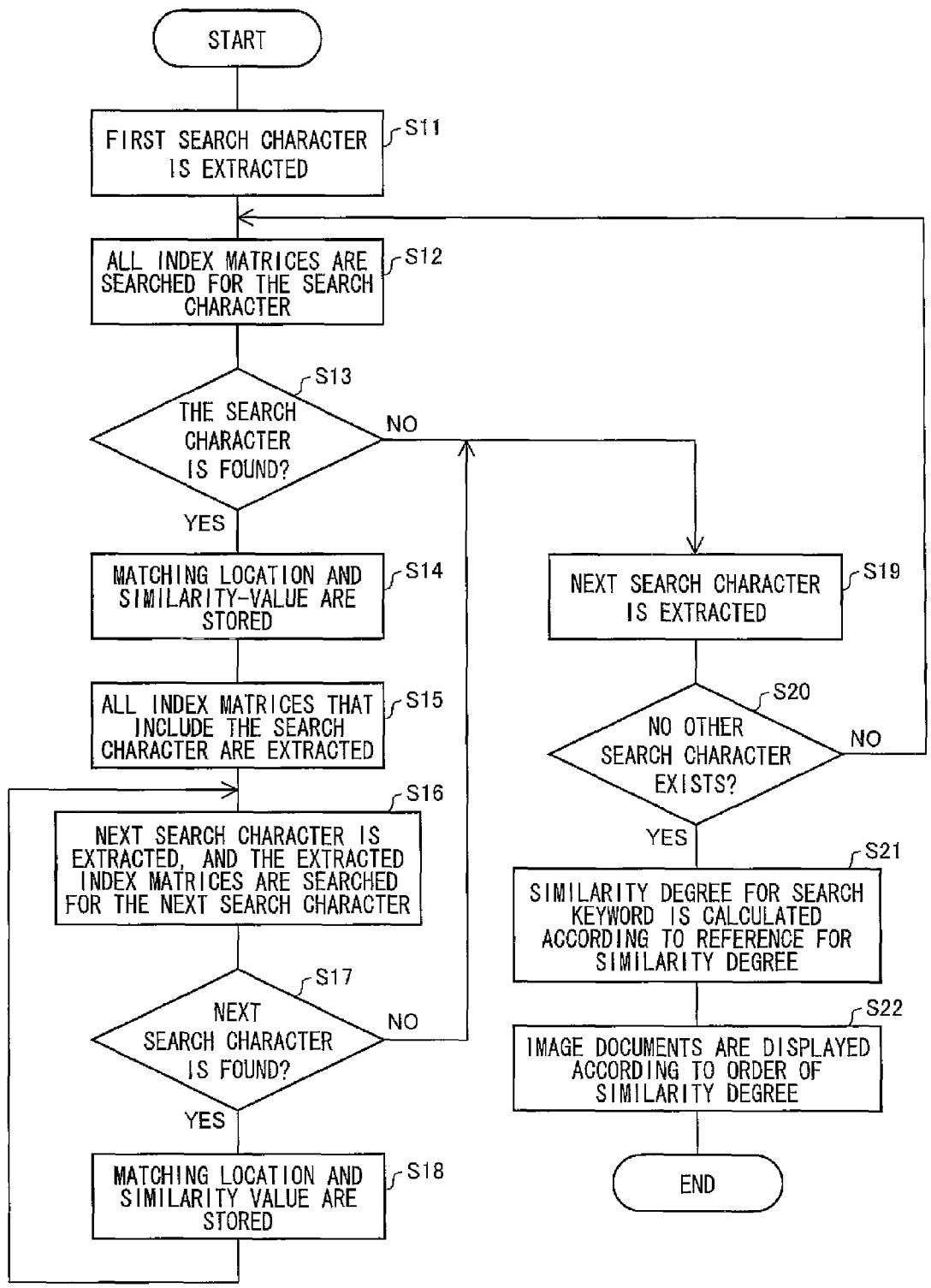
FIG. 11 is a flowchart illustrating a search procedure of the search section.

The following explains a search procedure. FIG. 11 is a flowchart showing a search procedure performed by the search section 22. When a search keyword including R number of character sequences is input and instruction of searching is given, the index-matrix searching process section 22a extracts a first search character of a search keyword (S11).

Next, the index-matrix searching process section 22a searches all index matrices in the index-information DB 17 for the first search character (S12).

When all of the index matrices have been searched, the index-matrix searching process section 22a judges whether the first search character is found or not. When the first search character is not found at all, the procedure goes to S19. When the first search character is found, the procedure goes to S14.

In S14, the index-matrix searching process section 22a stores, in the character-similarity-value storage section 22b, a matching position and a character-similarity value in an index matrix that includes the first search character.

Subsequently, the index-matrix searching process section 22a extracts all index matrices that include the first search character (S15). Then, the index-matrix searching process section 22a extracts a second search character that is positioned next to the first search character in the search keyword, and in search of the second character, the index-matrix searching process section 22a searches the index matrices that have been extracted in S15 and that include the first search character (S16).

When all of the index matrices having been extracted in S15 have been searched, the index-matrix searching process section 22a judges whether the second search character is found or not (S17). When the second search character is not found at all, the procedure goes to S19 as with the aforementioned case. When the second search character is found, the procedure goes to S18.

In S18, the index-matrix searching process section 22a stores, in the character-similarity-value storage section 22b, a matching position and a character-similarity value in an index matrix that includes the second search character.

Subsequently, the index-matrix searching process section 22a goes back to S16, extracts a third search character that is positioned next to the second search character in the search keyword, and in search of the third search character, the index-matrix searching process section 22a searches the index matrices that have been extracted in S15 and that include the first search character.

When all of the index matrices have been searched, the index-matrix searching process section 22a judges whether the third search character is found or not (S17). When the third search character is not found at all, the procedure goes to S19. When the third search character is found, the procedure goes to S18 again, and the index-matrix searching process section 22a searches for a search character that is positioned next to the third search character in the search keyword.

The index-matrix searching process section 22a performs the steps S16 to S18, i.e. a narrowing search to search the index matrices having been extracted in S15 and including the first search character so as to find the second and subsequent search characters, until the index-matrix search processing section 22a judges in S17 that no character is found or until the index-matrix search processing section 22a judges that all search characters included in the search keyword have been searched for. Thereafter, the procedure goes to S19.

In S19, the index-matrix search processing section 22a extracts the second search character that is positioned next to the first search character in the search keyword. Then, the index-matrix search processing section 22a judges whether other search character exists, that is, whether all search characters have been searched for (S20). When all search characters have not been searched for, the procedure goes back to S12.

In the same way as the above procedures, the index-matrix searching process section 22a searches all index matrices in the index-information DB 17 for the second search character. When the second search character is found, the index-matrix searching process section 22a stores a matching position and a character-similarity value of the index matrix and then goes to S15. Then, the index-matrix searching process section 22a repeatedly performs S16 to S18, i.e. a narrowing search to search all index matrices including the second search character so as to find the third and subsequent search characters that are positioned next to the second search character and thereafter in the search keyword.

With respect to the third and subsequent search characters, the index-matrix searching process section 22a performs the aforementioned searching, i.e. a procedure in which a search character is extracted in S19, index matrices including the next search character are extracted, and the index matrices are narrowed down using subsequent search characters.

When the index-matrix searching process section 22a extracts all search characters in the search keyword in S19, and when the index-matrix searching process section 22a judges in S20 that all search keywords have been searched for, the procedure goes to S21.

In S21, the similarity-degree calculating section 22c calculates the degree of similarity between the search keyword and the index matrices according to a reference for similarity degree, which will be mentioned later.

Then, the display-order determining section 22d determines the order of display so that an image document having an index matrix including high similarity-degree is firstly displayed. The image document extracting section 22e acquires image data of image documents from the image-document DB 19, and the search-result display section 25 displays the image documents sequentially in the order of high similarity-degree (S22).

Figure 13:
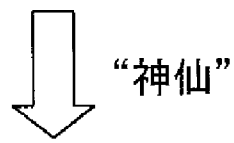
FIG. 13 is an explanatory drawing for illustrating a specific example of calculation of the similarity-degree between a search keyword and an index matrix.

With reference to FIGS. 12 and 13, the following explains a method for calculating the degree of similarity between an index matrix and a search keyword according to a reference for similarity degree in the similarity-degree calculating section 22c.

A block indicated by a reference numeral 101 in FIG. 12 describes search conditions. A block indicated by a reference numeral 102 describes a relative relationship between a supposed search keyword for calculating the degree of similarity and an index matrix. Under the search conditions shown in the block 101 and with a relative relationship between the search keyword and the index matrix shown in the block 102, the degree of similarity between the search keyword and the index matrix is calculated by an expression shown in a block 103.

First, an explanation is made as to the search conditions in the block 101. The number of characters included in the search keyword is R. A first search character is C1, a second search character is C2, ..., and an R-th search character is Cr.

The index matrix to be searched is an M×N matrix. That is, the number of characters included in a character sequence image extracted as a headline region T is M, and the number of candidate characters selected as candidates for each character of the character sequence is N.

Character-similarity values each indicative of similarity between a search character and a candidate character are set according to positions in the index matrix. Accordingly, the character-similarity values are disposed in a matrix that has the same dimensions as the index matrix. That is, a character-similarity-value matrix Weight is an M×N matrix. For example, Weight [i][j] indicates a character-similarity value in a case where a candidate character whose position is [i, j] (=Index [i][j]) in the index matrix is matched. In the present embodiment, when two character-similarity values are positioned at the same column-number [j], the two character-similarity values are the same regardless of the row-number [i].

A similarity-degree-weighting factor Q for rows is a weight to be multiplied with character-similarity values in two adjacent rows in the index matrix when search characters are matched with candidate characters in the two adjacent rows. When search characters are matched with candidate characters in two adjacent rows, there is a high possibility that the two rows contain two continuous characters, respectively, of the search keyword.

When the similarity-degree-weighting factor Q is set to be large, character-similarity values for two rows where matching continuously occurs greatly contribute to similarity-degree calculated by the similarity-degree calculating section 22c, whereas character-similarity-values for rows that are not adjacent to each other reduce the similarity-degree calculated by the similarity-degree calculating section 22c. That is, when the similarity-degree-weighting factor Q is set to be large, the result of searching gets closer to the result of searching performed with respect to each vocabulary. In contrast, when the similarity-degree-weighting factor Q is set to be small, the result of searching gets closer to the result of searching performed with respect to each character.

A character-similarity value for matching of a search character C1 is represented by W1, a character-similarity value for matching of a search character C2 is represented by W2, ..., and a character-similarity value for matching of a search character Cr is represented by Wr.

The following explains a relative relationship between a search keyword and an index matrix, which is assumed to calculate similarity-degree and is shown in the block 102.

The relationship between the search keyword and the index matrix is such that all of the search characters C1, C2, ..., and Cr are matched with candidate characters in the index matrix. Positions of the candidate characters with which the search characters C1, C2, ..., and Cr are matched in the index matrix, that is, matching positions of the candidate characters are represented by [C1i, C1j], [C2i, C2j], ..., and [Cri, Crj].

Another relative relationship is represented by an equation (1) in the block 102

$$C(k+1)i = Cki+1, \ C(m+1)i = Cmi+1 \ (m>k)$$

where k and m represent relative positions of search characters that are included in the search keyword, C(k+1)i represents a row-number of a candidate character with which a (k+1)th search character is matched in the index matrix, and Cki represents a row-number of a candidate character with which a kth search character is matched in the index matrix.

Accordingly, C(k+1)i=Cki+1 indicates that the row-number of the candidate character with which the (k+1)th search character is matched in the index matrix is obtained by adding 1 to the row-number of the candidate character with which the kth search character is matched in the index matrix. In other words, C(k+1)i=Cki+1 indicates that the (k+1)th search character and the kth search character of the search keyword are matched with candidate characters in two adjacent rows, respectively, of the index matrix.

Similarly, C(m+1)i=Cmi+1 (m>k) indicates that (m+1)th search character and the mth search character of the search keyword are matched with candidate characters in two adjacent rows, respectively, of the index matrix.

When such relative relationship exists between the search keyword and the index matrix, the degree of similarity between the search keyword and the index matrix is represented by an equation (2) shown in the block 103

SimDegree=$W1+W2+\ldots+W(k-1)+Q*(Wk+W(k+1))+\ldots+W(m-1)+Q*(Wm+W(m+1))+\ldots+Wr$ where W1 is a character-similarity value for matching of the first search character C1, W2 is a character-similarity value for matching of the second search character C2, W(k−1) is a character-similarity value for matching of the (k−1)th search character C(k−1), W(k) is a character-similarity value for matching of the kth search character Ck, W(k+1) is a character-similarity value for matching of the (k+1)th search character C(k+1), W(m−1) is a character-similarity value for matching of the (m−1)th search character C(m−1), W(m) is a character-similarity value for matching of the mth search character Cm, W(m+1) is a character-similarity value for matching of the (m+1)th search character C(m+1), and Wr is a character-similarity value for matching of the r-th search character Cr.

As described above, the similarity-degree is calculated by adding up (accumulating) character-similarity values W for all the search characters included in the search keyword.

Q*(Wk+W(k+1)) in the equation (2) indicates that the character-similarity values Wk and W(k+1) are multiplied by the similarity-degree-weighting factor Q for rows because the kth search character Ck and the (k+1)th search character C(k+1) are matched with candidate characters in two adjacent rows in the index matrix. Q*(Wm+W(m+1)) in the equation (2) indicates similarly.

W(k−1) and Wk are not multiplied by the similarity-degree-weighting factor Q because (k−1)th search character and kth search character included in the search keyword are not matched with candidate characters in two adjacent rows. The similar can be said about W(m−1) and Wm.

In the relative relationship between the search keyword and the index matrix which is shown in the block 102 of FIG. 12, it is supposed that all of the search characters C1, C2, . . . , and Cr are matched with the candidate characters in the index matrix. Accordingly, in the equation (2), the character-similarity values W1 to Wr for all the search characters are accumulated.

However, this is only an example. For example, when search characters have the relative relationship represented by the equation (1) and the search characters C1 and Cr are not matched with any candidate character in the index matrix, the similarity-degree is calculated by the following equation. Because the number of character-similarity degrees to be accumulated is smaller, the similarity-degree is lower.

SimDegree=$W2+\ldots+W(k-1)+Q*(Wk+W(k+1))+\ldots+W(m-1)+Q*(Wm+W(m+1))+\ldots+W(r-1)$ Further, when all of the search characters C1, C2, . . . , and Cr are matched with the candidate characters in the index matrix and when the (k+1)th search character and the kth search character of the search keyword are matched with candidate characters in two adjacent rows and the (k+2)th search character and the (k+1)th search character of the search keyword are matched with candidate characters in two adjacent rows, the similarity-degree is represented by the following equation SimDegree=$W1+W2+\ldots+W(k-1)+Q*(Wk+W(k+1))+W(k+2))+\ldots+Wr$ In this case, too, W(k−1) and Wk are not multiplied by the similarity-degree-weighting factor Q because (k−1)th search character and kth search character included in the search keyword are not matched with candidate characters in two adjacent rows.

With reference to FIG. 13, the following explains a specific example of calculation of the similarity-degree Here, the degree of similarity between the index matrix for the character sequence "去神仙居住的地方" (see Table 100) shown in FIG. 8 and a search keyword "神仙" is calculated.

Search conditions are shown in a block 104 in FIG. 13. A similarity-value matrix Weight is M×N dimensions, a character-similarity value is Weight[i]=[1, 1−1/N, 1−2/N, . . . , 1/N] (i=0, 1, . . . , M−1), and a similarity-degree-weighting factor is set to be Q.

The search keyword "神仙" is divided into a first search character "神" and a second search character "仙", and each search character is searched for from candidate characters in the index matrix.

Reference of the table 100 in FIG. 8 shows that the search character "神" is matched with [2, 2] of a position [i, j] in the index matrix, and that the search character "仙", is matched with [3, 1] in the index matrix.

Consequently, as shown in a block 105, a character-similarity value for the search character "神" is (1−1/N), and a character-similarity value for the search character "仙", is 1.

A row-number of the search character "神" is [2] and the row-number of the search character "仙", is [3]. As shown in the table 100 in FIG. 8, the two search characters are matched with candidate characters in two adjacent rows in the index matrix.

Accordingly, as shown in a block 106, the character-similarity value (1−1/N) for the search character ""神" " and the character-similarity value 1 for the search character "仙", are multiplied by the similarity-degree-weighting factor Q for rows, and as a result degree of similarity between the search keyword "神仙" and the index matrix for the character sequence "去神仙居住的地方" is SimDegree=$Q*((1-1/N)+1)$.

By flexibly adjusting parameters such as weighting (character-similarity value) in the character-similarity-value matrix and the similarity-degree-weighting factor Q for rows according to a user's request, the degree of similarity between the search keyword and the index matrix allows providing a more ideal result of searching.

Using the keyboard 1 etc., a user can suitably set parameters such as weighting (character-similarity value) in the character-similarity-value matrix and the similarity-degree weighting factor Q for rows according to necessity.

Such indexing and matching based on the features of an image is preferably applicable to indexing and searching of an image document with multiple languages. Such indexing and matching does not perform recognition of characters, and therefore has small amount of calculation. The present invention is applicable to an image document with various languages as well as Chinese language.

Figure 14:
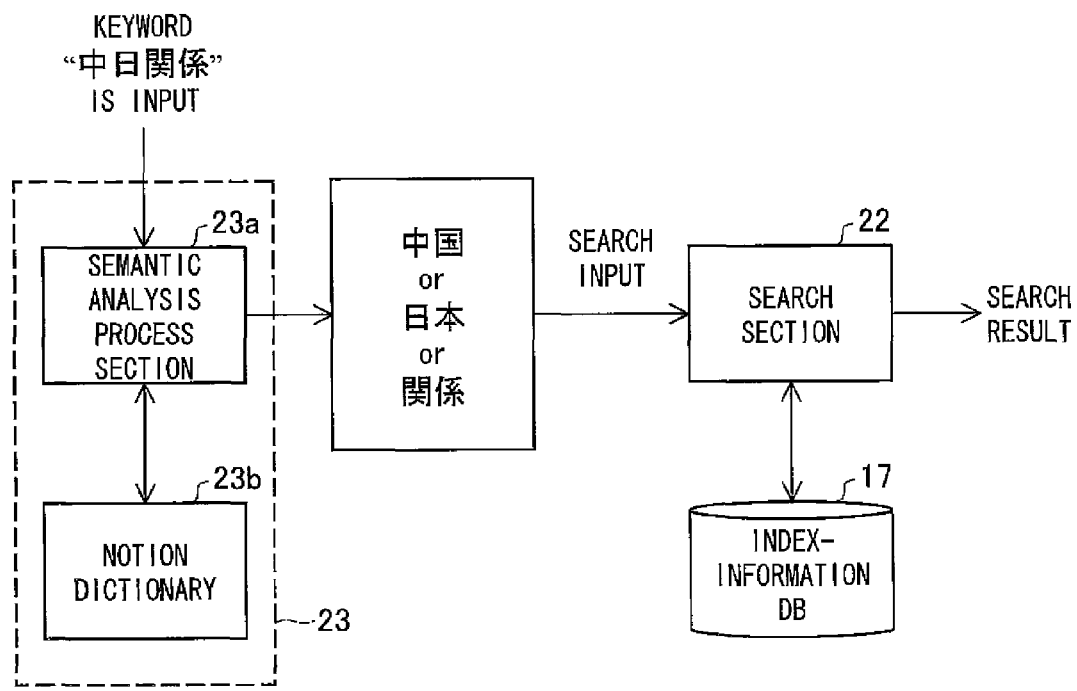
FIG. 14 is an explanatory drawing for illustrating a search process with a semantic analysis function.

The following explains a search process with a semantic analysis function (meaning-of-word analysis function). As shown in FIG. 1, the image document processing device of the present embodiment includes the semantic analysis section 23 between the search keyword input section 24 and the search section 22. FIG. 14 illustrates the search process with the semantic analysis function.

The semantic analysis section 23 includes a semantic analysis process section 23a and a notion dictionary 23b. When a search keyword is supplied from the search keyword input section 24, the semantic analysis process section 23a refers to the notion dictionary 23b and analyzes a vocabulary of the search keyword.

For example, when a search keyword "中日関係" (Chinese-Japanese relationship) is input, the semantic analysis process section 23a inputs, in the search section 22, three words "中国" (China), "日本" (Japan), and "関係" (relationship) for example as words relevant to the search keyword "中日関係". A relation of "or" exists among the three words "中国", "日本" and "関係" and a search expression is "中国" or "日本" or "関係"

The search expression "中国" or "日本" or "関係" is input to the search section 22. The search section 22 searches the index-information DB 17 and extracts an image document including "中国", an image document including "日本" and an image document including "関係".

This allows searching for not only an image document directly including the input search keyword but also for relevant image documents.

The following explains an image document management section 57 for performing an image-document management process. The image document management section 57 includes the character-image-feature extracting section 14, the font-feature dictionary 15, the feature matching section 16, the headline-region initial processing section 18, the image-document DB 19, the image-document-feature DB 20, the document-name generating section 51, the image-document-DB management section 52, the image-document display section 53, and the instruction input section 54. These sections are explained below.

Functions of the character-image-feature extracting section 14, the font-feature dictionary 15, the feature matching section 16, the headline-region initial processing section 18, the image-document DB 19, and the image-document-feature DB 20 have been already explained above. Here, an explanation will be made if necessary as to a function that is required to perform the image-document management process for making meaningful document names and managing image documents of the image-document-feature DB 20.

Figure 15:
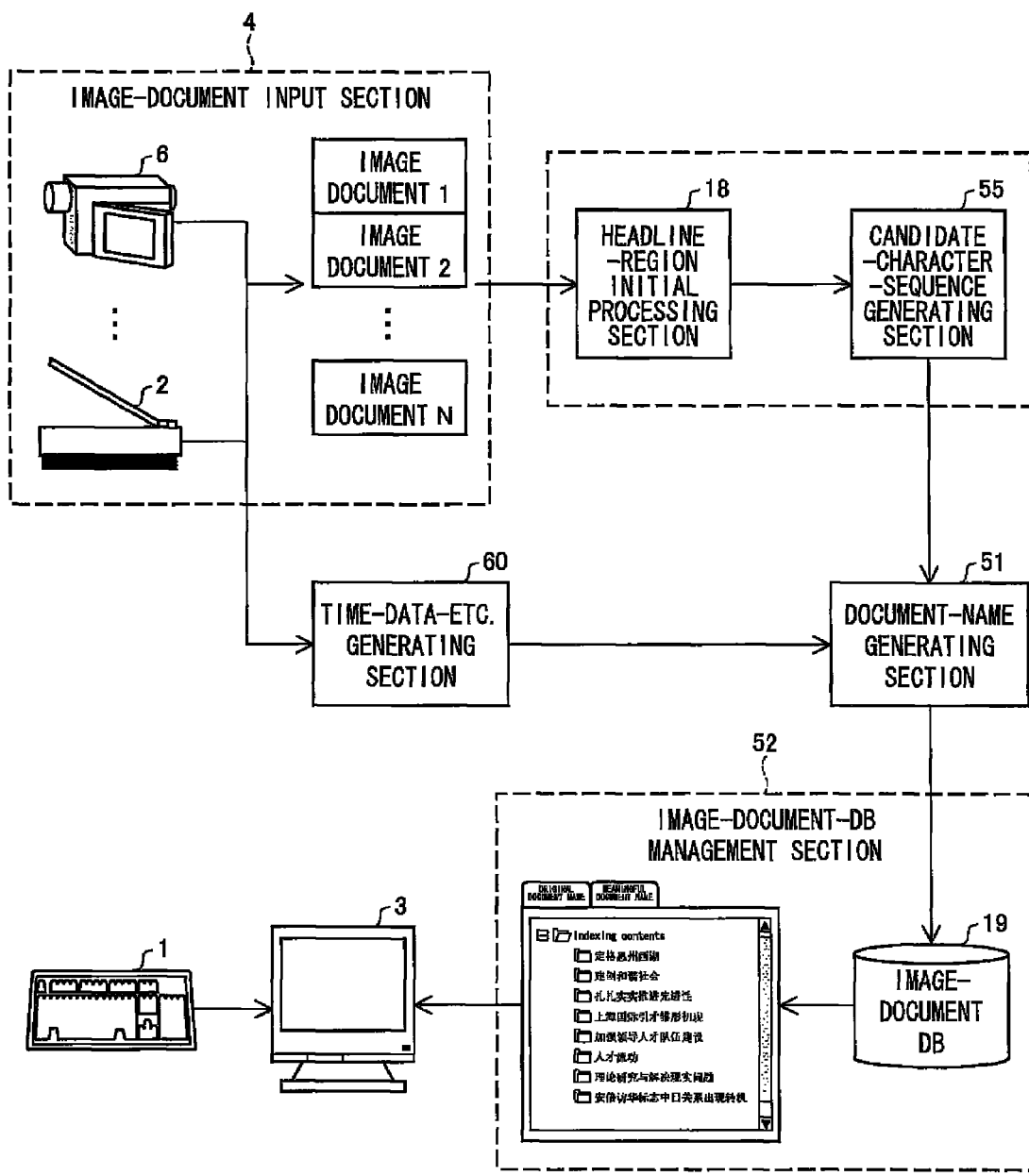
FIG. 15 is an explanatory drawing for illustrating a process of an image document management section.

The following explains the image-document management process with reference to FIG. 15. Image documents 1 to N are input from the image-document input section 21 that includes the image scanner 2 and the digital image capture device 6.

The headline-region initial processing section 18 analyzes each of the image documents 1 to N, clips a headline region from each of the image documents 1 to N, and acquires a character sequence from the headline region. Subsequently, although not shown in FIG. 15, the character-image-feature extracting section 14 divides an image of the character sequence included in the clipped headline region into images of individual characters, and extracts features of the images of the individual characters, as with the case explained above.

Then, based on the extracted features of images of the individual characters, a candidate-character-sequence generating section 55 including the font-feature dictionary 15 and the feature matching section 16 selects, as candidate characters, character images with high degree of matching in image features and generates a candidate character sequence that corresponds to the character sequence included in the clipped headline region. The candidate-character-sequence generating section 55 adjusts each candidate character included in the candidate character sequence through a semantic analysis method, and thus makes a meaningful candidate character sequence.

To be more specific, based on the features of the character images extracted by the character-image-feature extracting section 14, the candidate-character-sequence generating section 55 selects, as candidate characters, N (N is an integer of more than 1) character images in the order of degree of matching in image features, and generates an M×N index matrix where M (M is an integer of more than 1) is the number of characters included in the character sequence. This is the process performed by the feature matching section 16.

Subsequently, based on the generated index matrix, the feature matching section 16 generates a candidate character sequence in which candidate characters of rows that are provided at a first column are continuously aligned. The meaning of a word made of the continuous candidate characters of rows included in the candidate character sequence is analyzed and a candidate character of each row at the first column is adjusted so that the candidate character sequence makes sense.

Figure 16:
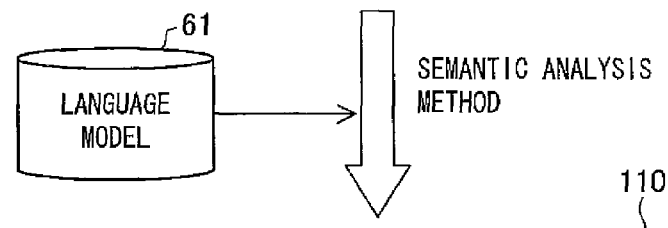
FIG. 16 is an explanatory drawing for illustrating a specific example of a process in which a generated index matrix is adjusted so that a character sequence on a first column makes sense.

FIG. 16 is an explanatory drawing for illustrating a specific example of adjusting the generated index matrix through the semantic analysis method so that the character sequence at the first column makes sense.

An unadjusted index matrix 109 illustrated at the upper part of FIG. 16 is the same as the index matrix illustrated as the table 100 in FIG. 8. The index matrix 109 is stored in the index-information DB 17 in this manner. A candidate character sequence generated from the index matrix 109 is "去神仙居住的地方", which does not make sense.

A candidate character sequence used for a meaningful document name must be semantically correct, such as the conjunction relationships of a subject, a prediction, and an object. For that reason, the candidate character sequence is converted into a meaningful candidate character sequence by semantic analysis. To be specific, with respect to error candidate characters, the notion dictionary can be used to analyze semantic information between the error candidate characters and other words in a candidate text, and the candidate character sequence is adjusted to be a meaningful character sequence.

The language model 61 used for the semantic analysis provides statistical data of printing types beginning with every kanji character. That is, the main concept of the language model 61 allows technically establishing an automatic indexing system, and thus allows statistical data concerning printing types of newspapers in Chinese language.

An example of the language model 61 is bi-gram model (language model). Bi-grams are groups of two characters, two syllables, or two words, and are quite generally used as a basis for simple statistical analysis of a text. Let denote a symbol sequence. It is assumed that the appearance of each symbol is an independent event in a symbol sequence. Therefore, the probability of this symbol sequence is defined as follows.

The chain rule of probability can be used to decompose this function. Chinese language is supposed to be an (N−1)-order Markov chain, in which the probability of a symbol is conditioned upon the prior occurrence of N−1 other symbols. This language model is called N-gram model.

The use of stochastic N-gram models has been long and successful in statistical natural language processing. N-grams are typically constructed from statistics obtained from a large corpus of text using the co-occurrences of characters or words in the corpus to determine character or word sequence probabilities. N-grams have an advantage of being able to cover a much larger language than would normally be derived directly from a corpus. In application to language modeling, because of computational limitations and the open nature of language (there are infinitely many possible characters or words), N is set to be 2 and the N-gram model is regarded as bi-gram model.

An index matrix 110 after adjustment is illustrated at the lower part of FIG. 16. "伸" at the second row and the first column is regarded as an error candidate character and is replaced with "神" at the second column. In the similar way, "任" at the fifth row and the first column is replaced with "住" at the third column. "罚" at the six row and the first column is regarded as an error candidate character in consideration of relationship between "居住" and "地", positioned before and after "酌", respectively, and "酌", is replaced with "的" at the second column.

Thus, the candidate character sequence at the first column of the index matrix 110 is "去神仙居住的地方" which makes sense. The feature matching section 16 may store the index matrix 110 after adjustment in the index-information DB 17.

In FIG. 15 again, the meaningful candidate character sequence thus generated by the candidate-character-sequence generating section 55 is sent to the document-name generating section 51.

The document-name generating section 51 generates a document name for an input image document, the document name including the meaningful candidate character sequence generated by the candidate-character-sequence generating section 55. The document name including the meaningful candidate character sequence is hereinafter referred to as a "meaningful document name".

Other data such as data indicative of the time when the image document is input and the route via which the image document is input is supplied from a time-data etc. generating section 60 to the document-name generating section 51. The document-name generating section 51 may generate a document name using other data that includes at least time data supplied from the time-data etc. generating section 60.

For example, out of other data, the time data may be included in the meaningful document name so that the meaningful document name consists of the time data and the meaningful candidate character sequence.

Alternatively, using other data such as the time data, other document name may be generated for the same image document. The document name consisting of other data such as the time data is hereinafter referred to as an original document name.

With such an arrangement, it is possible to manage one image document by using a meaningful document name and an original document name consisting of other data such as the time data.

Meaningful document names and original document names generated for individual image documents are sent to the image-document-DB management section 52 and are stored in the image-document DB 19 so that the meaningful document names and the original document names are related to image data of the image documents.

When a user inputs via the instruction input section 54 (illustrated in FIG. 1) including the keyboard 1 etc. an instruction to browse image documents accumulated in the image-document DB 19, the image-document-DB management section 52 causes the image-document display section 53 (illustrated in FIG. 1) including the display device 3 etc. to display a browsing window.

FIG. 17 illustrates an example of a browsing window, displayed by the image-document display section 53, for image documents stored in the image-document DB 19.

In FIG. 17, a window 201 illustrated at the left side shows a state in which a summary of original document names of the accumulated image documents is shown. The order in which the image documents have been input is shown above the window 201. An image document to which is given an original document name "AR-C262M_20060803_103140" seen closest on the paper is an image document that has been input on the oldest date in the window 201. "20060803" indicates a date when the image document has been input (Aug. 3, 2006) and "103140" indicates a time when the image document has been input (ten-thirty one, forty second). Further, "AR-C262M" indicates information indicative of the route via which the image document is input, that is, information indicative of a device that captured the image document.

When an operation such as selection of the tag "meaningful document name" is performed in the window 201, the browsing window changes from the window 201 to a window 202 that is illustrated at the right side of FIG. 17. The window 202 shows a state in which a summary of meaningful document names of the accumulated image documents is shown.

The window 202 corresponds to the window 201. An image document to which is given a meaningful document name "定格惠州西湖" seen closest on the paper is an image document that has been input on the oldest date in the window 202. English translations of the "meaningful document names" shown on the window 202 are "Attention is paid to Huizhou's West Lake", "Creation of amiable and relaxed society", "Steady promotion of spirit of innovation", "Model for acquiring international human resource in Shanghai emerges", "Education of human resource with a leadership", "Movement of human resource", "Research in theory and solution of actual problem", "Prime Minister Abe's visit to China changes Chinese-Japanese relationship", respectively, from the above.

As described above, when a summary of meaningful document names of image documents can be browsed, it is easy for a user to manage and search accumulated image documents. Further, when original document names are generated in addition, it is possible to see information such as time data as well as document names.

In the image document processing device of the present embodiment, index matrices are generated, and index information is generated based on the index matrices and is used for a search process. Therefore, the headline-region initial processing section 18 clips a plurality of headline regions T included in an image document and generates an index matrix for each of the headline regions T. However, when only generation of a meaningful document name for an image document is intended, it is unnecessary to extract a plurality of headlines in the image document and to generate an index matrix for each of the headlines.

That is, the present invention may be arranged so that an index matrix is generated for a character sequence (character image sequence) of a headline included in a headline region that indicates the contents of the image document most clearly, and a character sequence obtained by matching of features in the index matrix is used to generate a meaningful document name.

The headline region that indicates the contents of the image document most clearly may be determined according to a standard such that a headline region positioned at the uppermost row in the image document is selected out of a plurality of clipped headline regions. This is because a significant headline tends to be positioned at the uppermost row in the image document.

Further, the headline region that indicates the contents of the image document most clearly may be determined according to a standard such that a headline region whose character size is larger than a threshold value and is larger than character size of other clipped headline region is selected. This is because a significant headline tends to have larger character size than other headline.

Alternatively, the headline region that indicates the contents of the image document most clearly may be determined according to a standard such that a headline whose character has a font type different from that of other headline is selected. This is because a significant headline tends to have a font different from that of other headline. A standard other than the above standards may be used. The above standards may be used singularly or in combination.

Further, in the image document processing device of the present embodiment in which a plurality of headline regions are extracted for one image document and an index matrix is generated for each of the headlines, an index matrix for the most significant region may be specified according to a position of a headline, a character size of the headline, or a font of the headline. Further, particularly in that case, it is preferable that a candidate character sequence includes the most frequent words out of index matrices for clipped headline regions.

Lastly, each block of the image document processing device, in particular, the character-style normalizing section 12, the character-image-feature extracting section 14, the feature matching section 16, the headline-region initial processing section 18, the search section 22, the semantic analysis section 23, the document-name generating section 51, the image-document-DB management section 52 etc. may be realized by hardware logic or may be realized by software by using a CPU as described below.

Namely, the image document processing device 10 include: a CPU (central processing unit) for executing a program for realizing functions of each block; a ROM (read only memory) that stores the program; a RAM (random access memory) that develops the program; the storage device (storage medium) such as a memory for storing the program and various data; and the like. The object of the present invention can be realized in such a manner that the image document processing device is provided with a computer-readable storage medium for storing program codes (such as executable program, intermediate code program, and source program) of programs of the image document processing device which programs serve as software for realizing the functions, and a computer (alternatively, CPU or MPU) reads out and executes the program codes stored in the storage medium.

The storage medium is, for example, tapes such as a magnetic tape and a cassette tape, or discs such as magnetic discs (e.g. a Floppy Disc® and a hard disc), and optical discs (e.g. CD-ROM, MO, MD, DVD, and CD-R). Further, the storage medium may be cards such as an IC card (including a memory card) and an optical card, or semiconductor memories such as mask ROM, EPROM, EEPROM, and flash ROM.

Further, the image document processing device may be arranged so as to be connectable to a communication network so that the program code is supplied to the image document processing device through the communication network. The communication network is not particularly limited. Examples of the communication network include the Internet, intranet, extranet, LAN, ISDN, VAN, CATV communication network, virtual private network, telephone network, mobile communication network, and satellite communication network. Further, a transmission medium that constitutes the communication network is not particularly limited. Examples of the transmission medium include (i) wired lines such as IEEE 1394, USB, power-line carrier, cable TV lines, telephone lines, and ADSL lines and (ii) wireless connections such as IrDA and remote control using infrared ray, Bluetooth®, 802.11, HDR, mobile phone network, satellite connections, and terrestrial digital network. Note that the present invention can be also realized by the program codes in the form of a computer data signal embedded in a carrier wave, which is the program that is electrically transmitted.

As described above, the image document processing device of the present invention is an image document processing device for giving a document name to each of accumulated image documents and managing the image documents, the image document processing device including: a font-feature dictionary for storing features of images of individual characters; a headline clipping section for clipping a headline region included in an input image document; an image-feature extracting section for dividing an image of a character sequence included in the headline region into images of individual characters and extracting features of the images of individual characters; a candidate-character-sequence generating section for selecting, as candidate characters, images of characters each having high degree of matching of features based on the features of the images of individual characters that have been extracted by the image-feature extracting section and with reference to the font-feature dictionary, so as to generate a candidate character sequence corresponding to the character sequence, the candidate-character-sequence generating section adjusting the candidate characters included in the candidate character sequence through a semantic analysis method so as to generate a meaningful candidate character sequence; and a document-name generating section for generating a first document name for the input image document, the first document name including the meaningful candidate character sequence generated by the candidate-character-sequence generating section.

With the arrangement, the headline clipping section specifies a headline region in an image document and clips a character sequence in the headline region, i.e. a headline. Then, the image-feature extracting section divides an image of the extracted character sequence (headline) into images of individual characters and extracts features of the images of individual characters.

Subsequently, the candidate-character sequence generating section selects, as candidate characters, images of characters each having high degree of matching of features based on the features of the images of individual characters and with reference to the font-feature dictionary, so as to generate a candidate character sequence corresponding to the character sequence. Because the candidate character sequence has features similar to those of the character sequence in the headline region, there is a case that the candidate character sequence is equal to the character sequence in the clipped headline region and makes sense.

However, because matching is performed based on features of a font, there is a possibility that a character in the candidate character sequence is a different character whose shape is similar to that of a character in the character sequence in the headline region. For that reason, the candidate-character-sequence generating section adjusts candidate characters included in the candidate character sequence through a semantic analysis method so as to generate a meaningful candidate character sequence. This allows obtaining, with a high probability, a candidate character sequence that has the same characters and the same meaning as the headline in the clipped headline region.

With respect to the input image document, the document-name generating section generates a document name (first document name: meaningful document name) including the meaningful candidate character sequence generated by the candidate-character-sequence generating section. The image document is managed by use of the document name.

This allows automatically giving meaningful document names to accumulated image documents without requiring user's operation. Consequently, the user can browse the accumulated image documents by use of document names representing the contents of the image documents, and can easily manage and search the accumulated image documents.

Another image document processing device of the present invention is an image document processing device for giving a document name to each of accumulated image documents and managing the image documents, the image document processing device including: a font-feature dictionary for storing features of images of individual characters; a headline clipping section for clipping a headline region included in an input image document; an image-feature extracting section for dividing an image of a character sequence included in the headline region into images of individual characters and extracting features of the images of individual characters; a candidate-character-sequence generating section for selecting N (N is an integer of more than 1) images of characters as candidate characters in an order of high degree of matching of features so as to generate an M×N index matrix where M (M is an integer of more than 1) is the number of characters in the character sequence, the candidate characters being selected from the font-feature dictionary based on the features of the images of individual characters that have been extracted by the image-feature extracting section, the candidate-character-sequence generating section generating, based on the index matrix, a candidate character sequence in which a candidate character in each of continuous rows in the index matrix is sequentially aligned, the candidate-character-sequence generating section adjusting the candidate characters included in the candidate character sequence through a semantic analysis method so as to generate a meaningful candidate character sequence; and a document-name generating section for generating a first document name for the input image document, the first document name including the meaningful candidate character sequence generated by the candidate-character-sequence generating section.

The image document processing device is obtained by more specifically materializing the function of the candidate-character-sequence generating section in the previously mentioned image document processing device of the present invention.

In the image document processing device, the candidate-character-sequence generating section selects N (N is an integer of more than 1) images of characters as candidate characters in an order of high degree of matching of features so as to generate an M×N index matrix where M (M is an integer of more than 1) is the number of characters in the character sequence, the candidate characters being selected from the font-feature dictionary based on the features of the images of individual characters, the candidate-character-sequence generating section generating, based on the index matrix, a candidate character sequence in which a candidate character in each of continuous rows in the index matrix is sequentially aligned, the candidate-character-sequence generating section adjusting the candidate characters included in the candidate character sequence through a semantic analysis method so as to generate a meaningful candidate character sequence.

This easily realizes a candidate-character-sequence generating section for selecting, as candidate characters, images of characters each having high degree of matching of features based on the features of the images of individual characters and with respect to the font-feature dictionary, the candidate-character-sequence generating section generating a candidate character sequence corresponding to the character sequence, the candidate-character-sequence generating section adjusting the candidate characters included in the candidate character sequence through a semantic analysis method so as to generate a meaningful candidate character sequence.

Further, the image document processing device of the present invention may be arranged so that the document-name generating section causes the first document name to include data indicative of a time when the input image document is input, or may be arranged so that the document-name generating section generates a second document name including data indicative of a time when the input image document is input, the second document name being different from the first document name, the document-name generating section managing one image document by use of the first document name and the second document name.

Further, the image document processing device may be arranged so that the headline clipping section clips the headline region in the image document through a projective method and a statistical analysis of connected regions. This allows the headline clipping section to clip a headline region in an image document.

Further, the image document processing device of the present invention may be arranged so that the image-feature extracting section extracts the features of the images of individual characters based on a combination of (i) a feature of a grid direction and (ii) a feature of a periphery of an image of each character. This allows efficiently extracting the features of the images of individual characters according to a difference in character shapes.

The image document processing method of the present invention is an image document processing method for giving a document name to each of accumulated image documents and managing the image documents, the image document processing method including the steps of: (i) clipping a headline region included in an input image document; (ii) dividing an image of a character sequence included in the headline region into images of individual characters and extracting features of the images of individual characters; (iii) selecting, as candidate characters, images of characters each having high degree of matching of features based on the features of the images of individual characters that have been extracted in the step (ii) and with reference to a font-feature dictionary for storing features of images of individual characters, so as to generate a candidate character sequence corresponding to the character sequence, and adjusting the candidate characters included in the candidate character sequence through a semantic analysis method so as to generate a meaningful candidate character sequence; and (iv) generating a first document name for the input image document and managing the image document, the first document name including the meaningful candidate character sequence.

The image document processing method of the present invention is an image document processing method for giving a document name to each of accumulated image documents and managing the image documents, the image document processing method including the steps of: (i) clipping a headline region included in an input image document; (ii) dividing an image of a character sequence included in the headline region into images of individual characters and extracting features of the images of individual characters; (iii) selecting, as candidate characters, images of characters each having high degree of matching of features based on the features of the images of individual characters that have been extracted in the step (ii) and with reference to a font-feature dictionary for storing features of images of individual characters, so as to generate a candidate character sequence corresponding to the character sequence, and adjusting the candidate characters included in the candidate character sequence through a semantic analysis method so as to generate a meaningful candidate character sequence; and (iv) generating a first document name for the input image document and managing the image document, the first document name including the meaningful candidate character sequence, thus the image document processing method allowing management of the accumulated image documents by use of the first document name.

Further, the image document processing method of the present invention is an image document processing method for giving a document name to each of accumulated image documents and managing the image documents, the image document processing method including the steps of: (i) clipping a headline region included in an input image document; (ii) dividing an image of a character sequence included in the headline region into images of individual characters and extracting features of the images of individual characters; (iii) selecting N (N is an integer of more than 1) images of characters as candidate characters in an order of high degree of matching of features so as to generate an M×N index matrix where M (M is an integer of more than 1) is the number of characters in the character sequence, the candidate characters being selected, based on the features of the images of individual characters that have been extracted in the step (ii), from a font-feature dictionary for storing features of images of individual characters; and (iv) generating a first document name for the input image document based on the index matrix having been generated in the step (iii), and managing the image document, the first document name including a candidate character sequence in which a candidate character in each of continuous rows in the index matrix is sequentially aligned.

Further, the image document processing method of the present invention is an image document processing method for giving a document name to each of accumulated image documents and managing the image documents, the image document processing method including the steps of: (i) clipping a headline region included in an input image document; (ii) dividing an image of a character sequence included in the headline region into images of individual characters and extracting features of the images of individual characters; (iii) selecting N (N is an integer of more than 1) images of characters as candidate characters in an order of high degree of matching of features so as to generate an M×N index matrix where M (M is an integer of more than 1) is the number of characters in the character sequence, the candidate characters being selected, based on the features of the images of individual characters that have been extracted in the step (ii), from a font-feature dictionary for storing features of images of individual characters; and (iv) generating a first document name for the input image document based on the index matrix having been generated in the step (iii), and managing the image document, the first document name including a candidate character sequence in which a candidate character in each of continuous rows in the index matrix is sequentially aligned, thus the image document processing method allowing management of the accumulated image documents by use of the first document name.

Further, the present invention includes: a program for causing a computer to function as each section of the image document processing device of the present invention; and a computer-readable storage medium in which the program is stored.

That is, the image document processing device may be realized by hardware or may be realized by a computer executing a program. Specifically, the program of the present invention is a program for causing a computer to function as each of the aforementioned sections. The program is stored in the storage medium of the present invention.

When the program is executed by a computer, the computer functions as the image document processing device. Therefore, the computer exerts the same effect as the image document processing device.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An image document processing device for giving a document name to each of accumulated image documents and managing the image documents,
said image document processing device comprising:
a font-feature dictionary for storing features of images of individual characters;
a headline clipping section for clipping a headline region included in an input image document;
an image-feature extracting section for dividing an image of a character sequence included in the headline region into images of individual characters and extracting features of the images of individual characters;
a candidate-character-sequence generating section for selecting, as candidate characters, images of characters each having high degree of matching of features based on the features of the images of individual characters that have been extracted by the image-feature extracting section and with reference to the font-feature dictionary, so as to generate a candidate character sequence corresponding to the character sequence, the candidate-character-sequence generating section adjusting the candidate characters included in the candidate character sequence through a semantic analysis method so as to generate a meaningful candidate character sequence; and
a document-name generating section for generating a first document name for the input image document, the first document name including the meaningful candidate character sequence generated by the candidate-character-sequence generating section.

2. An image document processing device for giving a document name to each of accumulated image documents and managing the image documents,
said image document processing device comprising:
a font-feature dictionary for storing features of images of individual characters;
a headline clipping section for clipping a headline region included in an input image document;
an image-feature extracting section for dividing an image of a character sequence included in the headline region into images of individual characters and extracting features of the images of individual characters;
a candidate-character-sequence generating section for selecting N (N is an integer of more than 1) images of characters as candidate characters in an order of high degree of matching of features so as to generate an M×N index matrix where M (M is an integer of more than 1) is the number of characters in the character sequence, the candidate characters being selected from the font-feature dictionary based on the features of the images of individual characters that have been extracted by the image-feature extracting section, the candidate-character-sequence generating section generating, based on the index matrix, a candidate character sequence in which a candidate character in each of continuous rows in the index matrix is sequentially aligned, the candidate-character-sequence generating section adjusting the candidate characters included in the candidate character sequence through a semantic analysis method so as to generate a meaningful candidate character sequence; and a document-name generating section for generating a first document name for the input image document, the first document name including the meaningful candidate character sequence generated by the candidate-character-sequence generating section.

3. The image document processing device as set forth in claim 1, wherein the document-name generating section causes the first document name to include data indicative of a time when the input image document is input.

4. The image document processing device as set forth in claim 1, wherein the document-name generating section generates a second document name including data indicative of a time when the input image document is input, the second document name being different from the first document name, the document-name generating section managing one image document by use of the first document name and the second document name.

5. The image document processing device as set forth in claim 1, wherein the headline clipping section clips the headline region in the image document through a projective method and a statistical analysis of connected regions.

6. The image document processing device as set forth in claim 1, wherein the image-feature extracting section extracts the features of the images of individual characters based on a combination of (i) a feature of a grid direction and (ii) a feature of a periphery of an image of each character.

7. An image document processing method for giving a document name to each of accumulated image documents and managing the image documents, said image document processing method comprising the steps of:
(i) clipping a headline region included in an input image document;
(ii) dividing an image of a character sequence included in the headline region into images of individual characters and extracting features of the images of individual characters;
(iii) selecting, as candidate characters, images of characters each having high degree of matching of features based on the features of the images of individual characters that have been extracted in the step (ii) and with reference to a font-feature dictionary for storing features of images of individual characters, so as to generate a candidate character sequence corresponding to the character sequence, and adjusting the candidate characters included in the candidate character sequence through a semantic analysis method so as to generate a meaningful candidate character sequence; and
(iv) generating a first document name for the input image document and managing the image document, the first document name including the meaningful candidate character sequence.

8. An image document processing method for giving a document name to each of accumulated image documents and managing the image documents, said image document processing method comprising the steps of:
(i) clipping a headline region included in an input image document;
(ii) dividing an image of a character sequence included in the headline region into images of individual characters and extracting features of the images of individual characters;
(iii) selecting N (N is an integer of more than 1) images of characters as candidate characters in an order of high degree of matching of features so as to generate an M×N index matrix where M (M is an integer of more than 1) is the number of characters in the character sequence, the candidate characters being selected, based on the features of the images of individual characters that have been extracted in the step (ii), from a font-feature dictionary for storing features of images of individual characters; and
(iv) generating a first document name for the input image document based on the index matrix having been generated in the step (iii), and managing the image document, the first document name including a candidate character sequence in which a candidate character in each of continuous rows in the index matrix is sequentially aligned.

9. A non-transitory computer-readable storage medium storing a program which when executed by a processor causes the processor to execute the method as set forth in claim 7 or 8.

* * * * *